US008959062B2

(12) United States Patent
Ishii et al.

(10) Patent No.: US 8,959,062 B2
(45) Date of Patent: Feb. 17, 2015

(54) DATA STORAGE DEVICE WITH DUPLICATE ELIMINATION FUNCTION AND CONTROL DEVICE FOR CREATING SEARCH INDEX FOR THE DATA STORAGE DEVICE

(75) Inventors: Yohsuke Ishii, Kanagawa (JP); Takaki Nakamura, Kanagawa (JP); Kazuhito Yokoi, Kanagawa (JP)

(73) Assignee: Hitachi Solutions, Ltd., Tokyo (JP)

( * ) Notice: Subject to any disclaimer, the term of this patent is extended or adjusted under 35 U.S.C. 154(b) by 75 days.

(21) Appl. No.: 13/389,473

(22) PCT Filed: Aug. 13, 2009

(86) PCT No.: PCT/JP2009/064297
§ 371 (c)(1),
(2), (4) Date: Feb. 8, 2012

(87) PCT Pub. No.: WO2011/018852
PCT Pub. Date: Feb. 17, 2011

(65) Prior Publication Data
US 2012/0150827 A1 Jun. 14, 2012

(51) Int. Cl.
G06F 17/30 (2006.01)
(52) U.S. Cl.
CPC .... *G06F 17/30156* (2013.01); *G06F 17/30233* (2013.01); *G06F 17/30489* (2013.01)
USPC ........................................................ 707/692
(58) Field of Classification Search
USPC .................................. 707/692, 696, 711, 803
See application file for complete search history.

(56) References Cited

U.S. PATENT DOCUMENTS

| 5,937,401 | A * | 8/1999 | Hillegas ................................ 1/1 |
| 6,745,194 | B2 * | 6/2004 | Burrows ................................ 1/1 |
| 7,136,868 | B2 * | 11/2006 | Sonkin et al. ................. 707/754 |
| 7,747,584 | B1 * | 6/2010 | Jernigan, IV ................. 707/692 |
| 7,908,436 | B1 * | 3/2011 | Srinivasan et al. ............. 711/114 |
| 7,913,114 | B2 * | 3/2011 | Leppard ........................... 714/15 |
| 7,984,026 | B2 * | 7/2011 | Iitsuka .......................... 707/692 |
| 8,095,756 | B1 * | 1/2012 | Somavarapu et al. ........ 711/162 |
| 8,375,008 | B1 * | 2/2013 | Gomes ......................... 707/694 |
| 8,412,682 | B2 * | 4/2013 | Zheng et al. .................. 707/687 |
| 8,611,422 | B1 * | 12/2013 | Yagnik et al. ............ 375/240.16 |
| 8,645,333 | B2 * | 2/2014 | Balachandran et al. ...... 707/692 |
| 2002/0116402 | A1 * | 8/2002 | Luke ............................ 707/200 |
| 2003/0009743 | A1 * | 1/2003 | Fresko et al. ................. 717/117 |
| 2006/0020607 | A1 | 1/2006 | Patterson |
| 2007/0112960 | A1 * | 5/2007 | Joy et al. ....................... 709/224 |
| 2008/0155192 | A1 | 6/2008 | Iitsuka |
| 2008/0162478 | A1 * | 7/2008 | Pugh et al. ........................ 707/6 |
| 2008/0235163 | A1 * | 9/2008 | Balasubramanian et al. .. 706/12 |
| 2008/0243835 | A1 * | 10/2008 | Suzuki .............................. 707/5 |
| 2008/0294696 | A1 * | 11/2008 | Frandzel ....................... 707/200 |
| 2009/0192978 | A1 * | 7/2009 | Hewett et al. ..................... 707/1 |

(Continued)

FOREIGN PATENT DOCUMENTS

| JP | 2000-057159 A | 2/2000 |
| JP | 2006-048685 A | 2/2006 |

(Continued)

*Primary Examiner* — Cam-Linh Nguyen
(74) *Attorney, Agent, or Firm* — Mattingly & Malur, PC

(57) ABSTRACT

A file server performs duplicate elimination on files, and creates a virtual file system that does not include a duplicate file and is used for creating a search index. A search server acquires search target files from the virtual file system in the file server, and creates the search index.

16 Claims, 28 Drawing Sheets

(56) References Cited

U.S. PATENT DOCUMENTS

2010/0036887 A1* 2/2010 Anglin et al. ............... 707/200
2011/0016095 A1* 1/2011 Anglin et al. ............... 707/692

FOREIGN PATENT DOCUMENTS

| JP | 2008-158993 A | 7/2008 |
| JP | 2008-305225 A | 12/2008 |

* cited by examiner

Fig. 6

| Registered file ID (4110) | Registered file path name (4120) | Metadata of registered file (4130) | Corresponding stored file ID (4140) |
|---|---|---|---|
| f1 | a | ... | g1 |
| f2 | b | ... | g1 |
| f3 | c | ... | g2 |
| ... | | | |

| Stored file ID (4210) | Stored file path name (4220) | Metadata of stored file (4230) | Duplicate reference file count (4240) | Checking information (4250) | Corresponding registered file ID (4260) |
|---|---|---|---|---|---|
| g1 | P | ... | 2 | 0x1a573 | f1, f2 |
| g2 | Q | ... | 1 | 0x39d02 | f3 |
| ... | | | | | |

| Virtual file ID (4310) | Virtual file path name (4320) | Metadata of virtual file (4330) | Checking information (4340) | Corresponding stored file ID (4350) |
|---|---|---|---|---|
| v1 | A | ... | 0x1a573 | g1 |
| v2 | B | ... | 0x39d02 | g2 |
| ... | | | | |

| File path name (4410) | Creation date and time (4420) | Last update date and time (4430) | Metadata (4440) |
|---|---|---|---|
| A | 2000/10/15 12:30:00 | 2000/10/15 12:30:00 | ... |
| B | 2000/10/15 12:30:30 | 200/10/16 15:00:00 | ... |
| ... | | | |

4400

DATA STORAGE DEVICE WITH DUPLICATE ELIMINATION FUNCTION AND CONTROL DEVICE FOR CREATING SEARCH INDEX FOR THE DATA STORAGE DEVICE

TECHNICAL FIELD

The present invention relates to a technique of controlling a system including: a data storage device (for example, a file server) that stores a large amount of data; and a control device (for example, a search server) that provides a search service for the data stored in the data storage device. More specifically, the present invention provides a mechanism that provides a control device with a file group from which duplicate data is eliminated by a duplicate elimination function of a data storage device, as creation target files for a search index, to thereby enable a reduction in the processing load for creating the search index as well as a reduction in the volume required to store the search index.

BACKGROUND ART

In recent years, along with higher performance and lower costs of computer systems, the utilization of such computer systems is spreading in various types of business and for various purposes. Consequently, not only data that has conventionally been processed using paper media and the like but also music and moving pictures are computerized into multimedia data, and are saved in the computer system as data files. Further, the utilization of computer systems that are connected to one another via a network is also rapidly advancing. As a result, data can be managed and processed in a distributed manner, thus enabling a large-capacity storage that has been difficult to achieve with only one computer system as well as enabling high availability, high reliability, and high performance.

In addition, in recent years, the number of data files held in the computer system is enormous, and hence there arises a problem that a user cannot know where a required file is stored. In order to deal with this problem, a full-text search service is used recently. The full-text search service is provided by analyzing data of files stored in the computer system and storing in advance a search index corresponding to the respective pieces of data in a search server. The search service is provided broadly in the following procedure. First, the user transmits a search query to the search server. The search query is a character string for searching for a file to be acquired. The search server searches a search index on the basis of the received search query, and transmits a search result to the user. The user accesses a target file on the basis of the search result. Meanwhile, the number of data files stored in the computer system will be increasingly larger hereafter. Consequently, it will be further difficult for the user to perfectly know where which data file is stored. Accordingly, the importance of the search service will be increasingly higher hereafter, so that the utilization of the search service will further spread.

In order to create a search index, the conventional search server accesses a computer system that stores search target files, and then creates the search index after acquiring the target files. Unfortunately, in many cases, data files having the same contents are stored in an overlapping manner in the computer system that stores the search target files. For example, in the case where the computer system provides a file storage service to a plurality of users, the users may each create a copy of a file having the same contents and individually store the copy. In such a case, the conventional search server uniformly acquires even files containing the same data (so-called duplicate files) as ones of the target files from the computer system to create a search index. Unfortunately, this method causes an increase in the processing load of the search index as well as an increase in the volume required to store the search index.

A technique using a duplicate elimination method is disclosed as a method of eliminating the waste caused by creating a search index corresponding to such duplicate files. Specifically, there is disclosed a technique of deleting, in the search server, duplicate data from files acquired from the computer system and creating a search index for the remaining data files (Patent Literature 1). In the search server adopting this technique, the number of target files for creating a search index can be reduced by eliminating the duplicate data, which leads to a reduction in the processing load required to create the search index and a reduction in the volume required to store the search index.

In addition, there is disclosed a technique of: causing the search server that cooperates with the computer system to acquire in advance the duplicate condition of search target files from the computer system; thus preventing the search server from acquiring duplicate files in an overlapping manner; and creating a search index for only target files not including the duplicate files (Patent Literature 2). In the search server adopting this technique, the duplicate files do not need to be acquired from the computer system, which leads to a reduction in the number of files exchanged between the computer system and the search server. As a result, in the case of adopting this mechanism, even the network load can be reduced in addition to the effects obtained in Patent Literature 1.

CITATION LIST

Patent Literature

Patent Literature 1: U.S. Patent Publication No. 2006/0020607 A Patent Literature 2: U.S. Patent Publication No. 2008/0155192 A

SUMMARY OF INVENTION

Technical Problem

According to the technique disclosed in Patent Literature 1, however, the search server itself detects the duplicate condition of the search target files, deletes the duplicate files, and then creates the search index. Accordingly, the processing load for detecting the duplicate condition is additionally placed onto the search server. Furthermore, the processing load on the search server for the duplicate detection is larger in proportion to the number of files stored in the computer system. Accordingly, in an environment in which the number of search target files is large, the disadvantage that the processing load required for the duplicate detection is larger cannot be ignored, even allowing for advantages brought by the duplicate elimination, such as the reduction in the processing load for creating the search index and the reduction in the data amount of the search index.

In addition, according to the technique disclosed in Patent Literature 2, the process of detecting the duplicate condition of the search target files is performed by the computer system. Accordingly, the processing load on the search server can be reduced compared with that in the technique disclosed in Patent Literature 1. Meanwhile, the search server needs to separately perform the process of acquiring information on the duplicate condition of the files from the computer system and then selecting the search target files on the basis of the information. That is, the search server disclosed in Patent Literature 2 needs to be additionally provided with a function for cooperation with the duplicate elimination function of each computer system. However, the function for cooperation needs to conform to functional specifications specific to a computer system with which the search server cooperates. Accordingly, in order to cooperate with another computer system having a similar duplicate elimination function, it is necessary to additionally provide the search server with a new function for cooperation. This impairs the portability of the search server.

The above-mentioned problem results from the need to provide the search server with the processing function for detecting the duplicate files from the acquired files or the special processing function for the cooperation with the duplicate elimination function implemented by the computer system. Accordingly, in order to solve the above-mentioned problem, required is a mechanism that can reduce the processing load on the search server for creating the search index without additionally providing the search server with such a special function for cooperation.

Solution to Problem

In view of the above, the present invention provides a mechanism adopting the following processing modes and processing functions. The gist of the present invention is to provide a data storage device with the following processing functions, the data storage device having a duplicate elimination function concerning duplicate detection of stored data and deletion of duplicate data. That is, the gist of the present invention is to provide the data storage device with a function of executing duplicate elimination of the stored data and a function of creating a file system for search index creation in its own device, before file acquisition for the search index creation by a control device (search server) that provides a search service.

The file system in this case is created by a file system management function that provides a file system image not containing duplicate data with the use of the duplicate elimination function for the stored data, of the data storage device. With the data storage device being provided with the file system management function, the control device (search server) that provides the search service can acquire only files from which duplication of the stored data is eliminated, as search target files without being provided with a special function for cooperation, so that the number of target files for the search index creation can be reduced. As described above, the gist of the present invention is to provide the data storage device with the file system management function that increases the speed of the search index creation process.

Note that the present invention can additionally adopt the following processing modes and processing functions. For example, it is also possible to provide the data storage device with a function of transmitting a trigger to the control device (search server) that creates the search index, after the creation of the file system image without a duplicate file, the trigger notifying the control device of a factor for starting the search index creation. In this case, the control device (search server) is notified of the trigger by means of a trigger transmission function of the data storage device. Upon the reception of this trigger notification, the control device (search server) starts processes necessary for the search index creation, that is, a process of acquiring search target data from the data storage device and a process for creating the search index from the acquired data. At this time, the control device (search server) acquires the search target data from the file system image provided by the data storage device.

Advantageous Effects of Invention

According to the present invention, the number of target files for the search index creation by the control device (search server) can be reduced without providing the search server with a special function for cooperation. Accordingly, the speed of the search index creation process by the control device (search server) can be increased. In addition, the data amount for the search index in the control device (search server) can be reduced. As a result, in a system including: the data storage device that stores a large amount of data; and the control device (search server) that provides the search service of files stored in the data storage device, processing costs of the search index creation by the control device (search server) and storage costs of the search index data in the control device (search server) can both be reduced.

The present invention can also be configured as a control system or a control method instead of the above-mentioned control device. In addition, the present invention can also be achieved in various modes such as a computer program that implements the above-mentioned control device, a recording medium that records the program therein, and data signals that contain the program and are realized in a carrier wave.

In the case where the present invention is configured as the computer program, the recording medium that records the program therein, or the like, the present invention may be configured as the entirety of a program that controls the control device, or may be configured as a program that constitutes only a part fulfilling the functions of the present invention. In addition, examples of the recording medium include a flexible disk, CD-ROM, DVD-ROM, a punched card, printed materials on which codes such as bar codes are printed, and various computer-readable volatile memory media and nonvolatile memory media such as an internal memory device and an external memory device of a computer.

BRIEF DESCRIPTION OF DRAWINGS

FIG. 6 is an explanatory diagram illustrating a registered file management table.

FIG. 7 is an explanatory diagram illustrating a stored file management table.

FIG. 8 is an explanatory diagram illustrating a virtual file system management table.

FIG. 9 is an explanatory diagram illustrating a crawled file management table.

DESCRIPTION OF EMBODIMENTS

Hereinafter, embodiments of the present invention are described with reference to the drawings. Note that the following embodiments are given as examples, and other embodiments can also be implemented by combination or replacement with known or common techniques.
Embodiment 1

In the present embodiment, description is given of a processing method in which: a virtual file system made of a file group without duplication after duplicate elimination is created in a file server; and a search server crawls the virtual file system to create a search index.

Figure 1:
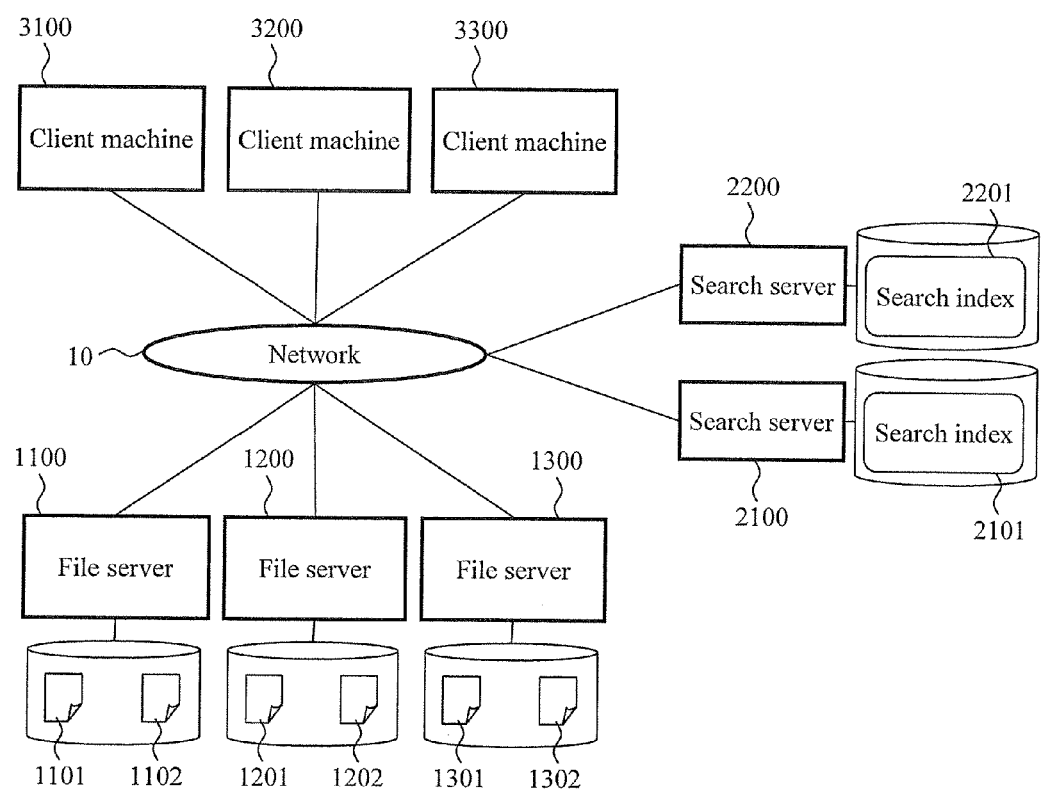
FIG. 1 is a diagram illustrating a system configuration example.

FIG. 1 is an explanatory diagram illustrating a system configuration according to an embodiment of the present invention. A plurality of file servers 1100, 1200, and 1300, a plurality of search servers 2100 and 2200, and a plurality of client machines 3100, 3200, and 3300 are connected to one another via a network 10. In this system, each search server creates a search index of data stored in each file server, and the search server provides each client machine with a search service of files in the file server, using the created search index.

Specific contents of the service are as follows. First, each client machine can register a data file into each file server. The file server performs a duplicate elimination process on the registered data file, and stores and holds the resultant data file in its own external memory device. Each search server acquires the data file registered in the file server by crawling, creates a search index, and stores and holds the search index in its own external memory device. Meanwhile, the client machine can transmit, to the search server, a search request in which a search query is specified. The search server extracts data files that match conditions of the specified search query, using the search index held by the search server itself, and provides a search result to the client machine. The client machine selects an access target file on the basis of the search result, and accesses the target file in the file server using a file path name for file access stored in the search result.

The file servers respectively store files 1101, 1102, 1201, 1202, 1301, and 1302 to be searched for by the search servers. In addition, the search servers respectively store search indexes 2101 and 2201 to be used for the search service. The client machines respectively access the file servers and the search servers via the network 10 on the basis of an appropriate access protocol.

Note that FIG. 1 illustrates three types of components, that is, the file servers, the search servers, and the client machines as separate devices, but the present invention is not limited thereto. If possible, two of the three types or all the three types may be implemented as one device. In addition, the connection mode of the network 10 may be any network mode, and thus may be implemented by, for example, Internet connection or intranet connection via a local area network.

Figure 2:
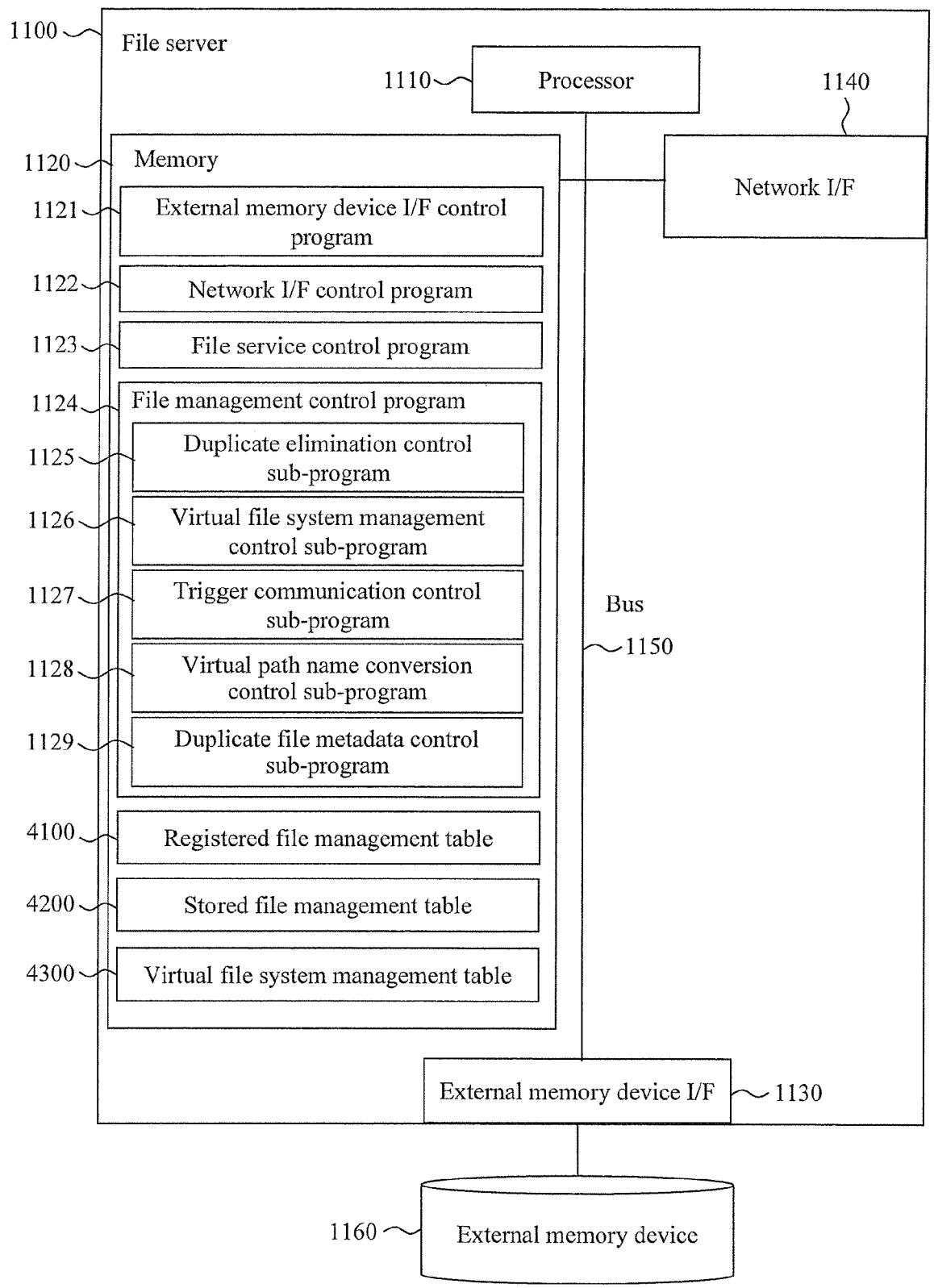
FIG. 2 is a diagram illustrating a hardware configuration example of a file server.

FIG. 2 is an explanatory diagram illustrating a hardware configuration of the file server 1100. The file server 1100 includes: a processor 1110 that executes programs; a memory 1120 that temporarily stores the programs and data; an external memory device I/F 1130 for accessing an external memory device 1160; a network I/F 1140 for accessing other devices connected via the network; and a bus 1150 that connects these components to one another. The memory 1120 stores: an external memory device I/F control program 1121 for controlling the external memory device I/F 1130; a network I/F control program 1122 for controlling the network I/F 1140; a file service control program 1123 for managing the file service provided by the file server 1100; a file management control program 1124 for providing a function of managing the files registered in the file server 1100; and a registered file management table 4100, a stored file management table 4200, and a virtual file system management table 4300 that are used by the file management control program 1124.

The file management control program 1124 includes: a duplicate elimination control sub-program 1125; a virtual file system management control sub-program 1126; a trigger communication control sub-program 1127; a virtual path name conversion control sub-program 1128; and a duplicate file metadata control sub-program 1129. The duplicate elimination control sub-program 1125 performs a process of deleting duplicate data from the files registered in the file server 1100 and storing the remaining files into the external memory device 1160. The duplicate data is detected by, for example, a checking process on a file level or a checking process on a fixed block level, the fixed block constituting a file. The virtual file system management control sub-program 1126 performs a process of creating a file system image that the file server 1100 shows to the search server 2100 in order to enable the search server 2100 to create a search index 2101 of the file group registered in the file server 1100. The trigger communication control sub-program 1127 performs a process of enabling the file server 1100 to explicitly notify the search server 2100 of a factor for starting a search index creation and update process. The virtual path name conversion control sub-program 1128 performs a process of converting a file path name in a virtual file system provided by the virtual file system management control sub-program 1126 into a file path name actually stored in the file server 1100, for the creation of the search index 2101 by the search server 2100. With this program, even in the case where the file server 1100 receives a file access request with a virtual path name from the client machine 3100, such path name conversion in the file server 1100 enables the client machine 3100 to access a desired file. Lastly, with regard to a given file in the virtual file system provided by the virtual file system management control sub-program 1126, the duplicate file metadata control sub-program 1129 performs a process of providing, in the case where another file containing data that overlaps with that of the given file is registered in the file server 1100, information of metadata (a file owner, creation date and time, access right information, and the like) of all registered files containing data that overlaps with that of the another file registered in the file server 1100. With this program, with regard to a file from which duplicate data has been eliminated in the file server 1100, metadata of other duplicate files registered in the file server 1100 can be acquired also from the outside of the file server 1100.

Note that the registered file management table 4100, the stored file management table 4200, and the virtual file system management table 4300 are described later. In addition, the configurations of the other file servers 1200 and 1300 are the same as the configuration of the file server 1100, and hence description thereof is omitted.

Figure 3:
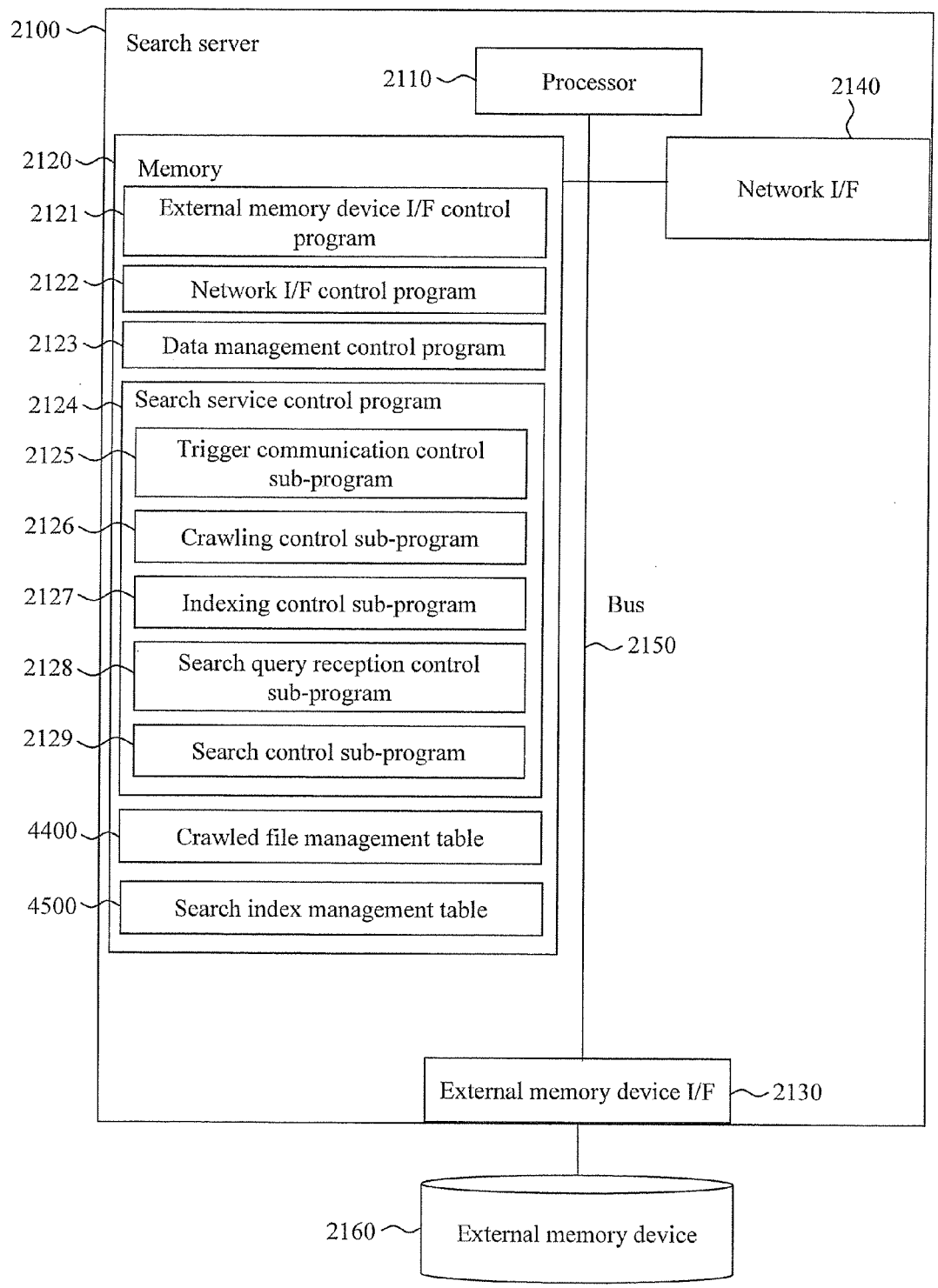
FIG. 3 is a diagram illustrating a hardware configuration example of a search server.

FIG. 3 is an explanatory diagram illustrating a hardware configuration of the search server 2100. The search server 2100 includes: a processor 2110 that executes programs; a memory 2120 that temporarily stores the programs and data; an external memory device I/F 2130 for accessing an external memory device 2160; a network I/F 2140 for accessing other devices connected via the network; and a bus 2150 that connects these components to one another. The memory 2120 stores: an external memory device I/F control program 2121 for controlling the external memory device I/F 2130; a network I/F control program 2122 for controlling the network I/F 2140; a data management control program 2123 for providing a file system or a database that is used by the search server 2100 in order to manage held data; a search service control program 2124 for enabling the search server 2100 to provide a search service; and a crawled file management table 4400 and a search index management table 4500 that are used by the search service control program 2124.

The search service control program 2124 includes: a trigger communication control sub-program 2125; a crawling control sub-program 2126; an indexing control sub-program 2127; a search query reception control sub-program 2128; and a search control sub-program 2129. The trigger communication control sub-program 2125 performs a process necessary to: receive a massage to the effect that the file server 1100 explicitly notifies the search server 2100 of the factor for starting the search index creation and update process; and start the creation of the search index upon the reception thereof. The crawling control sub-program 2126 performs a process of acquiring, in response to a creation start request of the search index, target files from the file server 1100 that stores the file group for which the search index is to be created, in order to create the search index. The indexing control sub-program 2127 performs a process of analyzing the contents of the target files on the basis of the files acquired by the crawling control sub-program 2126 and creating the search index 2101. The search query reception control sub-program 2128 performs a process of receiving, from the client machine 3100, a search request in which a search query is specified and returning a search result after the search control sub-program 2129 to be described below performs a necessary process. Lastly, the search control sub-program 2129 performs a process of searching for files that match the search conditions, in response to the search request from the client machine 3100. At the time of this search, the search index 2101 separately created by the indexing control sub-program 2127 is used.

Note that the crawled file management table 4400 and the search index management table 4500 are described later. In addition, the configuration of the other search server 2200 is the same as the configuration of the search server 2100, and hence description thereof is omitted.

Figure 4:
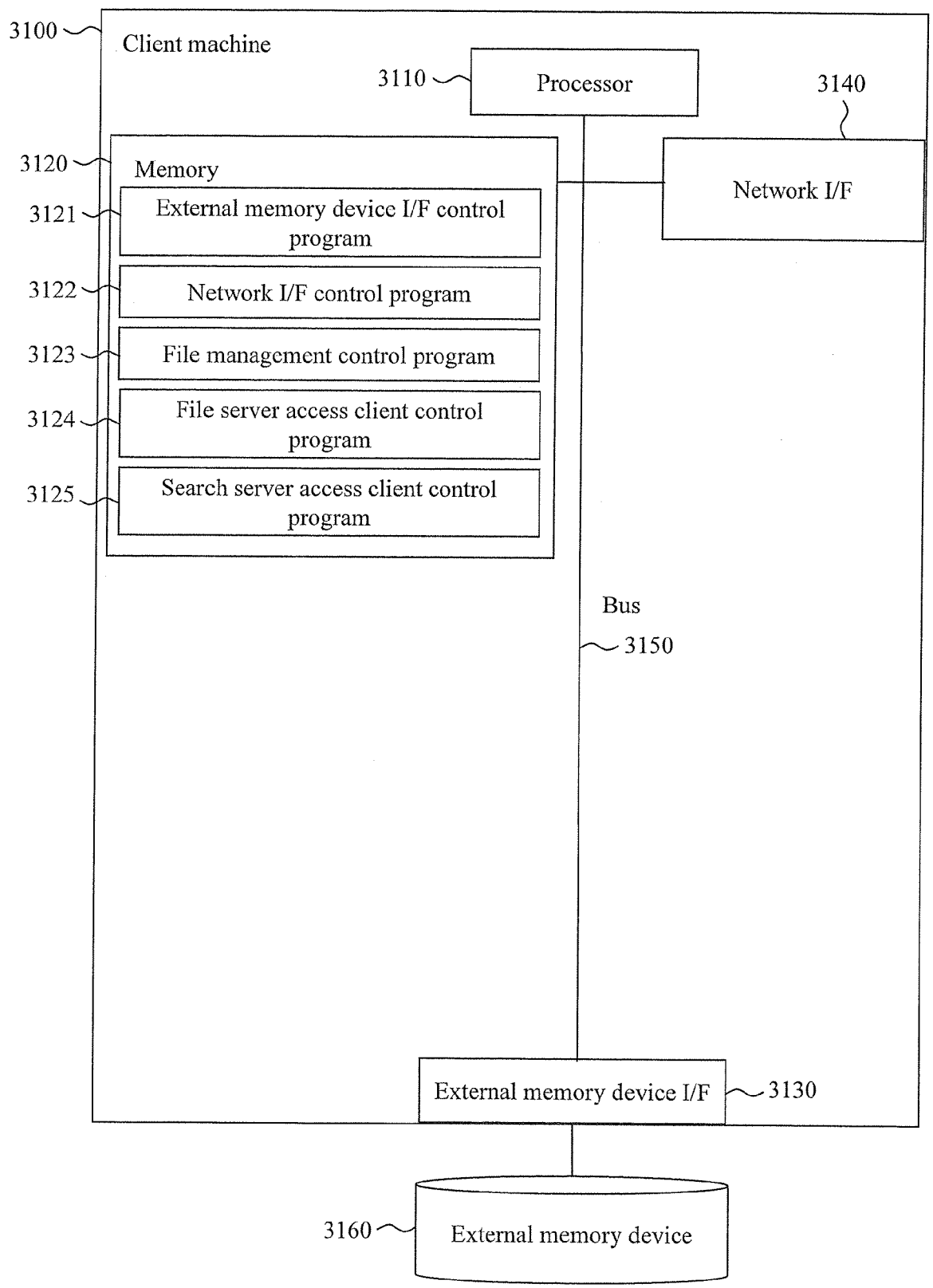
FIG. 4 is a diagram illustrating a hardware configuration example of a client machine.

FIG. 4 is an explanatory diagram illustrating a hardware configuration of the client machine 3100. The client machine 3100 includes: a processor 3110 that executes programs; a memory 3120 that temporarily stores the programs and data; an external memory device I/F 3130 for accessing an external memory device 3160; a network I/F 3140 for accessing other devices connected via the network; and a bus 3150 that connects these components to one another. The memory 3120 stores: an external memory device I/F control program 3121 for controlling the external memory device I/F 3130; a network I/F control program 3122 for controlling the network I/F 3140; a file management control program 3123 for providing a file system that is used by the client machine 3100 in order to manage held files; a file server access client control program 3124 for using the file service provided by the file server 1100; and a search server access client control program 3125 for using the search service provided by the search server 2100. Here, the file server access client control program 3124 uses an NFS client program if the file service uses an NFS protocol, uses a CIFS client program if the file service uses a CIFS protocol, and uses an HTTP client program (Web browser and the like) if the file service uses an HTTP protocol. In addition, the search server access client control program 3125 uses an HTTP client program (Web browser and the like) if the search service uses an HTTP protocol.

Note that the configurations of the other client machines 3200 and 3300 are the same as the configuration of the client machine 3100, and hence description thereof is omitted.

Figure 5:
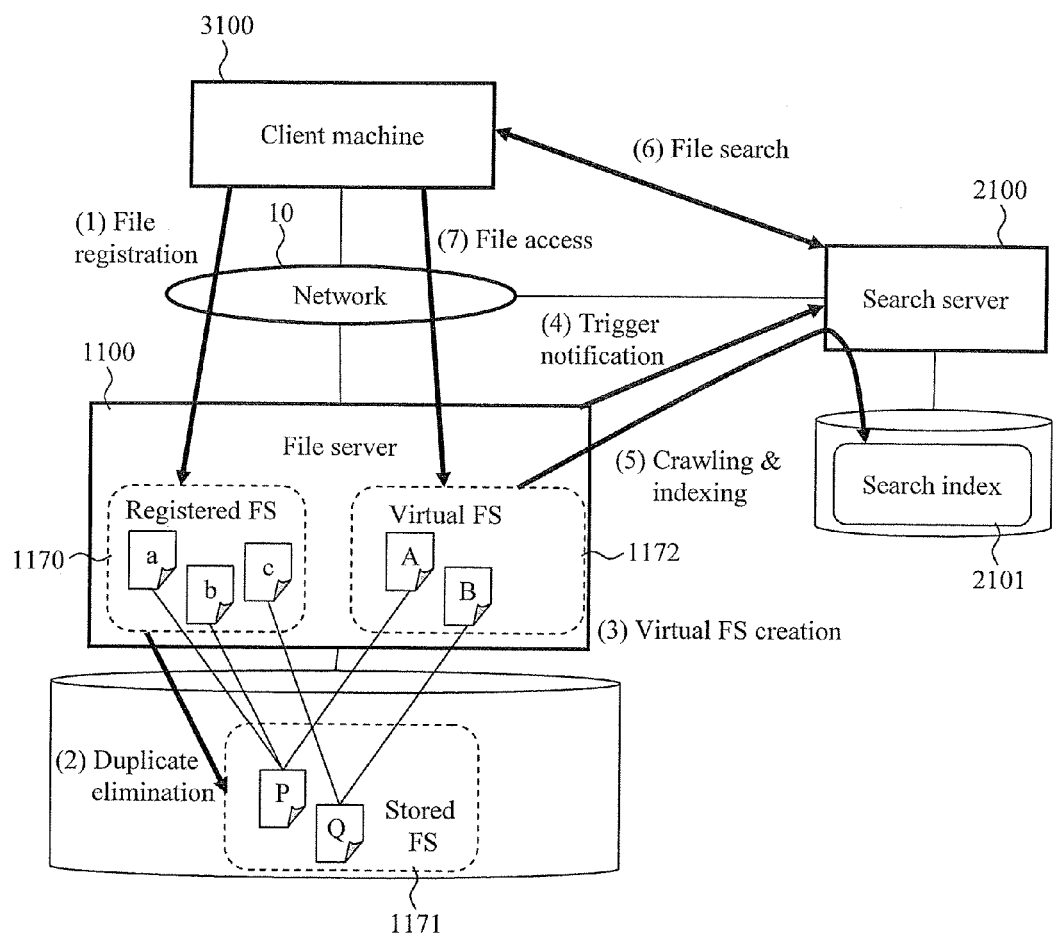
FIG. 5 is an explanatory diagram illustrating a series of processing images concerning file storage, search index creation, file search, and file access.

FIG. 5 is an explanatory diagram illustrating a series of processing images concerning file storage, search index creation, file search, and file access. Specifically, the series of processing includes seven processing steps to be described in the following.

First of all, in Processing Step (1), the client machine 3100 registers data files into the file server 1100. The files registered in the file server 1100 are managed by a registered file system 1170 in the file server 1100. The registered file system 1170 is a file system image that can be seen by the client machine 3100. The client machine 3100 can access the registered files using file path names ("a", "b", "c", and the like) in the registered file system 1170.

Next, in Processing Step (2), the file server 1100 eliminates duplicate data from the data file group in the registered file system 1170, and then stores the file group after the duplicate elimination into a stored file system 1171 in the file server 1100. The stored file system 1171 is a file system image that actually stores the actual bodies of the data files in the file server 1100. The registered file system 1170 does not manage the actual bodies themselves of the data files, but manages metadata of the registered files and information on the stored file path names in the stored file system 1171. The actual bodies of the data files are managed using the stored file system 1171. The example of FIG. 5 shows that the contents overlap between the files having the registered file path names "a" and "b" in the registered file system 1170. The actual bodies of these data files are managed as one file by the stored file system 1171 using a stored file path name "P". On the other hand, the example of FIG. 5 shows that the contents of the file having the registered file path name "c" do not overlap with those of the other files. The actual body of this data file is managed using a stored file path name "Q".

Next, in Processing Step (3), the file server 1100 creates a virtual file system 1172 as a file system image to be provided to the search server 2100. The virtual file system 1172 corresponds to the snapshot of a file system image in which duplicate files are deleted from the file group registered in the file server 1100. The example of FIG. 5 shows that the files having the stored file path names "P" and "Q" in the stored file system 1171 are respectively associated with virtual file path names "A" and "B" in the virtual file system 1172. The virtual file system 1172 does not manage the actual bodies themselves of the data files, but manages metadata of the virtual files and information on the stored file path names in the stored file system 1171.

Next, in Processing Step (4), after creating the virtual file system 1172, the file server 1100 notifies the search server 2100 of a trigger that serves as a factor for starting the search index creation. Upon the reception of this trigger notification, the search server 2100 starts the search index creation, whereby a useless search index creation process can be suppressed while files are not updated in the file server 1100.

Next, in Processing Step (5), upon the reception of the trigger communication, the search server 2100 performs: a process of acquiring target files from the virtual file system 1172 in the file server 1100 (crawling process); and a process of creating the search index 2101 on the basis of the acquired files (indexing process). In this step, because the crawling process is performed on the virtual file system 1172 not containing duplicate data, the need to acquire a useless file from the file server 1100 can be eliminated, and the volume of the search index 2101 created by the search server 2100 can be reduced. The search index 2101 manages the correspondence between a given keyword character string and identification information on a file in which the character string exists. Specifically, the search index 2101 manages the virtual file path names ("A", "B", and the like) in the virtual file system 1172 as the file identification information.

Next, in Processing Step (6), the client machine 3100 transmits, to the search server 2100, a search request in which a search query is specified, in order to search for a file registered in the file server 1100. The search server 2100 receives the search request to search for a file group that matches conditions of the specified search query, using the search index 2101. If the search server 2100 can extract the file group that matches the conditions, the search server 2100 puts the file group together as a search result, and provides the search result to the client machine 3100 as the request source. Here, the search result includes: the list of the files that match the conditions; and the file identification information (in this case, the virtual file path names) necessary to access the files.

Lastly, in Processing Step (7), the client machine 3100 determines a target file to be actually accessed on the basis of the search result acquired in Processing Step (6), and specifies the virtual file path name thereof included in the search result to transmit a file access request to the file server 1100. The file server 1100 receives the file access request, and if the specified file path name is a virtual file path name, the file server 1100 converts this virtual file path name into a corresponding registered file path name in the registered file system 1170. This conversion is performed using management information in the file server 1100, specifically, the correspondence relation between the virtual file path name and the stored file path name as well as the correspondence relation between the stored file path name and the registered file path name After converting the virtual file path name into the corresponding registered file path name, the file server 1100 acquires a target registered file, and provides this file to the client machine 3100 as the request source.

FIG. 6 is a diagram illustrating the configuration of the registered file management table 4100 managed in the file server 1100. With the registered file management table 4100, the file server 1100 manages information on the files registered by the client machine 3100. Specifically, the registered file management table 4100 includes items of a registered file ID 4110, a registered file path name 4120, metadata 4130 of each registered file, and a corresponding stored file ID 4140.

Here, the registered file ID 4110 is an identifier for uniquely identifying each registered file, and corresponds to a serial number that is given by the file server 1100 at the time of file registration. The registered file path name 4120 is an identification name that is specified by the client machine 3100 at the time of registering a target file, and corresponds to a file name or a file path name that is specified by the client machine 3100 at the time of the file registration. The metadata 4130 of each registered file is an aggregation of metadata associated to the target registered file. For example, the metadata 4130 corresponds to information such as a file owner, file creation date and time, a file size, and information on the right to access each file. The corresponding stored file ID 4140 is identification information on the location in which the data file main body corresponding to the target registered file is stored. The corresponding stored file ID 4140 is given when the target file is stored into the stored file system 1171.

FIG. 7 is a diagram illustrating the configuration of the stored file management table 4200 managed in the file server 1100. With the stored file management table 4200, the file server 1100 manages information on the files registered by the client machine 3100, the files being actually stored into the external memory device 1160 in the file server 1100 after duplicate elimination. Specifically, the stored file management table 4200 includes items of a stored file ID 4210, a stored file path name 4220, metadata 4230 of each stored file, a duplicate reference file count 4240, checking information 4250, and a corresponding registered file ID 4260.

Here, the stored file ID 4210 is an identifier for uniquely identifying each file from which duplicate data is eliminated in the file server 1100 and which is actually stored into the external memory device 1160, and corresponds to a serial number that is given by the file server 1100 at the time of file storage. The stored file path name 4220 is an identification name that is specified by the file server 1100 at the time of storing a target file, and corresponds to a file path name at the time of the file storage. The metadata 4230 of each stored file is an aggregation of metadata associated to the target stored file. For example, the metadata 4230 corresponds to information such as date and time of file storage into the stored file system 1171, a file size, and information on the right to access each file. The duplicate reference file count 4240 represents the number of registered files that refer to the target stored file. In the case where a plurality of registered files share one stored file as a result of the duplicate elimination, the value of the duplicate reference file count 4240 is equal to or more than 2. For example, in the case where this value is 2, two registered files refer to the target stored file. The checking information 4250 is information for determining whether or not the data file contents overlap in the target stored file. For example, the checking information 4250 corresponds to a hash value of the target data file. The file server 1100 performs duplicate determination on the target file using the checking information 4250. In the case where duplicate files are found, only any one of the files is stored, thus achieving the duplicate elimination. The corresponding registered file ID 4260 is identification information on the registered file corresponding to the target stored file. As described above, the corresponding registered file ID 4260 is given when the target file is registered into the registered file system 1170. A number of registered file IDs are registered in the section of the registered file ID 4260, the number being the same as the number registered in the section of the duplicate reference file count 4240.

FIG. 8 is a diagram illustrating the configuration of the virtual file system management table 4300 managed in the file server 1100. With the virtual file system management table 4300, the file server 1100 manages information on the virtual file system provided for the search server 2100. Specifically, the virtual file system management table 4300 includes items of a virtual file ID 4310, a virtual file path name 4320, metadata 4330 of each virtual file, checking information 4340, and a corresponding stored file ID 4350.

Here, the virtual file ID 4310 is an identifier for uniquely identifying each virtual file registered in the virtual file system 1172 in the file server 1100, and corresponds to a serial number that is given by the file server 1100 at the time of virtual file system update. The virtual file path name 4320 is a file path name that is used by the search server 2100 at the time of accessing a target file via the file system image of the virtual file system 1172. The virtual file path name 4320 is given by the file server 1100 at the time of the virtual file system update. The metadata 4330 of each virtual file is an aggregation of metadata associated to the target virtual file. For example, the metadata 4330 corresponds to information such as date and time of file registration into the virtual file system 1172, a file size, and last file access date and time. The checking information 4340 is information for determining, at the time of the virtual file system update, whether or not the file contents overlap between already registered virtual files and a candidate file to be newly registered into the virtual file system 1172. For example, the checking information 4340 corresponds to a hash value of the target data file. The file server 1100 performs duplicate determination on the target file using the checking information 4340. In the case where a duplicate file is found, a data file having the same contents has already been registered in the virtual file system 1172, and hence this candidate file is not registered into the virtual file system 1172. The corresponding stored file ID 4350 is identification information on a file that stores the data file main body corresponding to the target virtual file. The corresponding stored file ID 4350 is given when the target file is stored into the stored file system 1171.

FIG. 9 is a diagram illustrating the configuration of the crawled file management table 4400 managed in the search server 2100. With the crawled file management table 4400, the search server 2100 manages information on files that are acquired from the file server 1100 in order to create the search index. Specifically, the crawled file management table 4400 includes items of a file path name 4410, creation date and time 4420, last update date and time 4430, and metadata 4440.

Here, the file path name 4410 stores therein a file path name that is actually accessed by the search server 2100 at the time of acquiring a target file from the file server 1100. In this case, the virtual file path name in the virtual file system 1172 provided by the file server 1100 corresponds to this file path name. The creation date and time 4420 stores therein information on creation date and time of the file that is acquired by the search server 2100 from the file server 1100. The last update date and time 4430 stores therein information on last update date and time of the file that is acquired by the search server 2100 from the file server 1100. With the use of the information on the last update date and time 4430, in the crawling process, the information on the last update date and time 4430 in the crawling management table 4400 is compared with the information on the last update date and time of the target file in the file server 1100. Then, if the two are coincident with each other, the search server 2100 can determine that no update has been performed since the previous crawling. In this way, the indexing process after the crawling can be skipped. The metadata 4440 is an aggregation of metadata associated to the target file. For example, the metadata 4440 corresponds to a file size and information on date and time at which the information on the target file is registered into the crawled file management table 4400.

Figure 10:
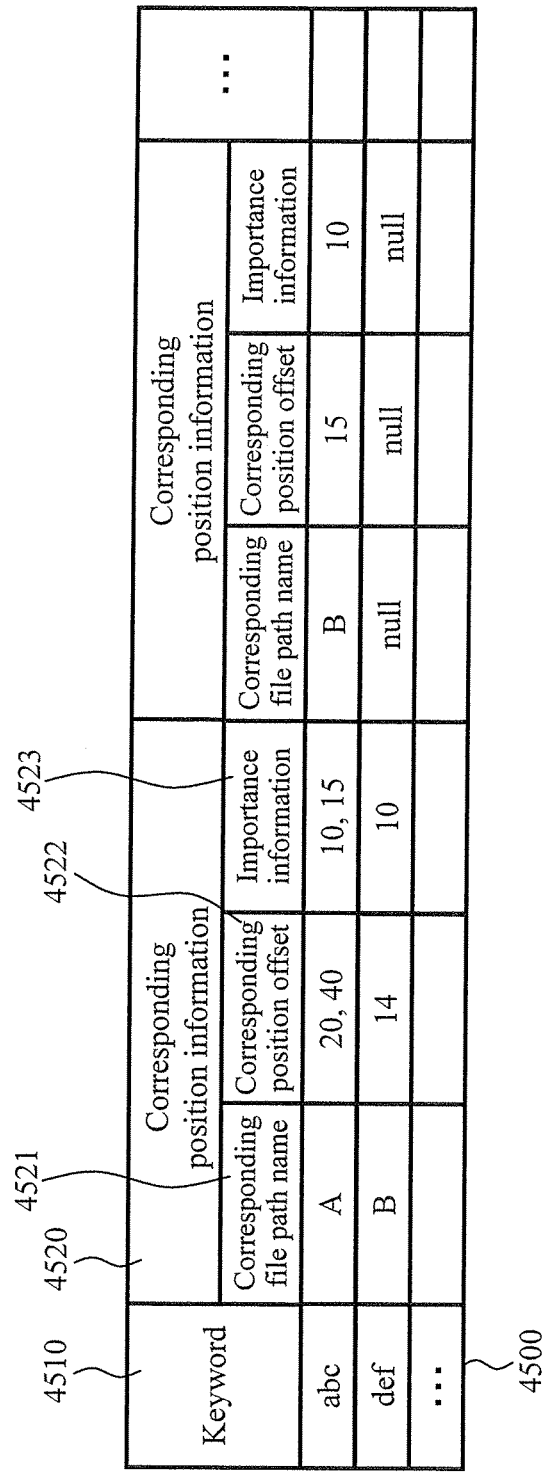
FIG. 10 is an explanatory diagram illustrating a search index management table.

FIG. 10 is a diagram illustrating the configuration of the search index management table 4500 managed in the search server 2100. With the search index management table 4500, information on the search index created by the search server 2100 is managed. Specifically, the search index management table 4500 includes information items of a keyword 4510 and corresponding position information 4520.

The keyword 4510 stores therein a character string obtained by analyzing a target file in the indexing process. The corresponding location information 4520 registers therein information on a file in which the character string of the keyword 4510 exists. The corresponding location information 4520 includes items of a corresponding file path name 4521, a corresponding position offset 4522, and importance information 4523. The corresponding file path name 4521 registers therein a file path name of the target file as information for identifying the file in which the character string of the keyword appears. The corresponding position offset 4522 registers therein offset information on a position at which the character string of the keyword appears in the file. In the case where the character string appears at a plurality of portions in one file, a plurality of pieces of offset information are registered in this section. The importance information 4523 registers therein a value of importance in the fact that the character string of the keyword appears at the offset of the file. This value of importance is set as appropriate by the search server 2100. In the definition of this value, the importance is higher as this value is larger. In addition, this value can be used for narrowing down and arranging the search result. Note that a plurality of pieces of the corresponding position information 4520 can be registered for one keyword 4510. This can deal with even the case where a plurality of files corresponding to the keyword character string exist.

Hereinabove, the configuration of the system and the configuration of the management information provided by the present invention have been described. Hereinafter, a processing method achieved by the present invention is described. Description is given below of a file registration process (FIG. 11), a file storage process with a duplicate elimination process (FIG. 12), a virtual file system update process at the time of file registration (FIG. 13), a crawling and indexing process (FIG. 14), a file search process (FIG. 15), a file acquisition process (FIG. 16), a file update process (FIG. 17), a stored file update process with a duplicate elimination process (FIG. 18), a virtual file system update process at the time of file update (FIG. 19), a file deletion process (FIG. 20), a stored file deletion process with a duplicate elimination process (FIG. 21), and a virtual file system update process at the time of file deletion (FIG. 22).

Figure 11:
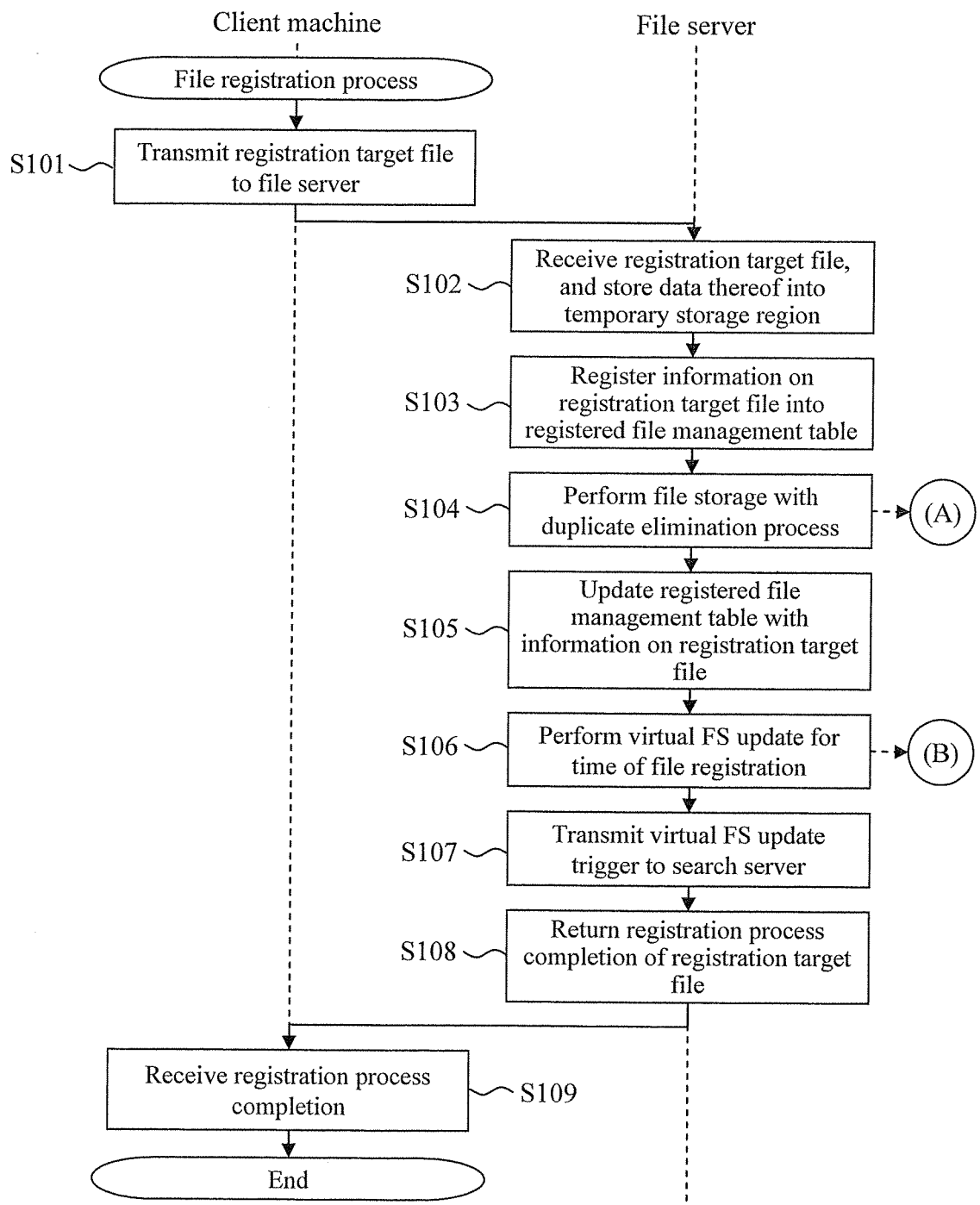
FIG. 11 is a flowchart for describing an exemplary file registration process.

With reference to FIG. 11, description is given of a series of processing flow in the file registration process. First of all, the client machine 3100 transmits a registration target file to the file server 1100 (Step S101). Next, the file server 1100 receives the registration target file transmitted from the client machine 3100, and stores data thereof into a temporary storage region in the file server 1100 (Step S102). Next, the file server 1100 registers information on the registration target file into the registered file management table 4100 (Step S103). Note that, in this step, information on the corresponding stored file ID 4140 is not registered into the registered file management table 4100. Next, the file server 1100 performs the file storage process with the duplicate elimination process on the registration target file (Step S104). The file storage process with the duplicate elimination process is described later in detail. Next, the file server 1100 updates the section of the corresponding stored file ID 4140 in the registered file management table 4100, with the value of the stored file ID 4210 stored in Processing Step S104 (Step S105). Next, the file server 1100 performs the virtual file system update process for the time of the file registration (Step S106). The virtual file system update process for the time of the file registration is described later in detail. After the end of the virtual file system update, the file server 1100 transmits a virtual file system update trigger to the search server 2100 (Step S107). Upon the reception of this trigger, the search server 2100 starts a search index update process. After the transmission of the trigger, the file server 1100 returns a registration process completion of the registration target file to the client machine 3100 as the request source (Step S108). Lastly, the client machine 3100 receives the registration process completion transmitted from the file server 1100, and ends the process (Step S109).

Incidentally, in this processing flow, the file registration process, the file storage process, and the virtual file system update process in the file server 1100 are synchronously executed. A processing flow in which these processes are asynchronously executed is described later as other embodiments.

Figure 12:
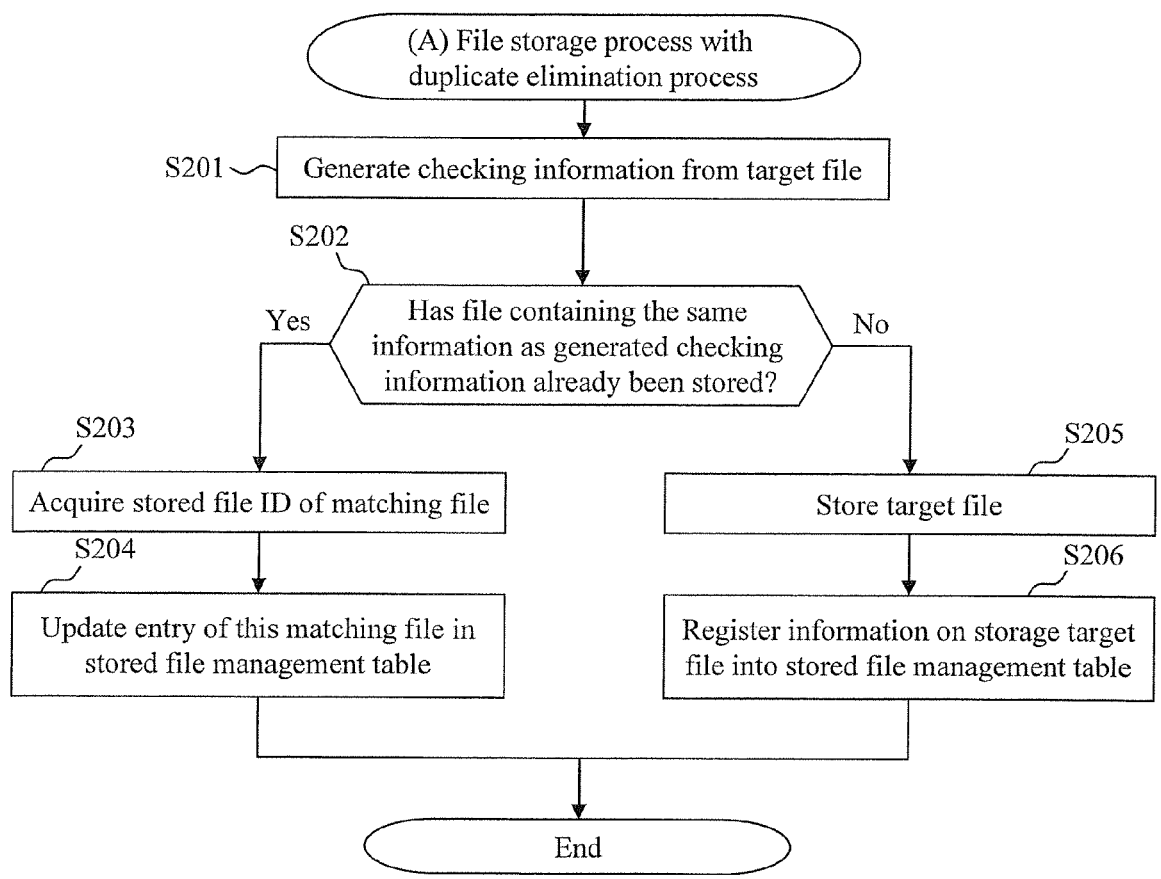
FIG. 12 is a flowchart for describing an exemplary file storage process with a duplicate elimination process.

With reference to FIG. 12, description is given of a series of processing flow in the file storage process with the duplicate elimination process. This processing flow corresponds to the detailed processing flow of Processing Step S104 in FIG. 11. First of all, the file server 1100 generates checking information from the registration target file of this time (Step S201). The checking information is generated in this step using the same method as the method of generating checking information for the entry of the checking information 4250 in the stored file management table 4200. After the generation of the checking information, the file server 1100 examines whether or not a file containing the same information as the generated checking information has already been stored (Step S202). Specifically, the file server 1100 examines whether or not a file that matches the checking information generated this time exists in the entry of the checking information 4250 in the stored file management table 4100. If Yes in Processing Step S202, the file server 1100 acquires the stored file ID 4210 of the matching file from the stored file management table 4200 (Step S203). Next, the file server 1100 updates the entry of the matching file in the stored file management table 4200 (Step S204), and ends the process. Specifically, the file server 1100 increases the duplicate reference file count 4240 of this entry, and adds and registers the registered file ID 4110 of the registered file into the section of the corresponding registered file ID 4260. On the other hand, if No in Processing Step S202, the file server 1100 determines that a file having contents that overlap with the contents of the target file is not stored, and stores the target file (Step S205). After the storage thereof, the file server 1100 registers information on the storage target file into the stored file management table 4200 (Step S206), and ends the process.

Figure 13:
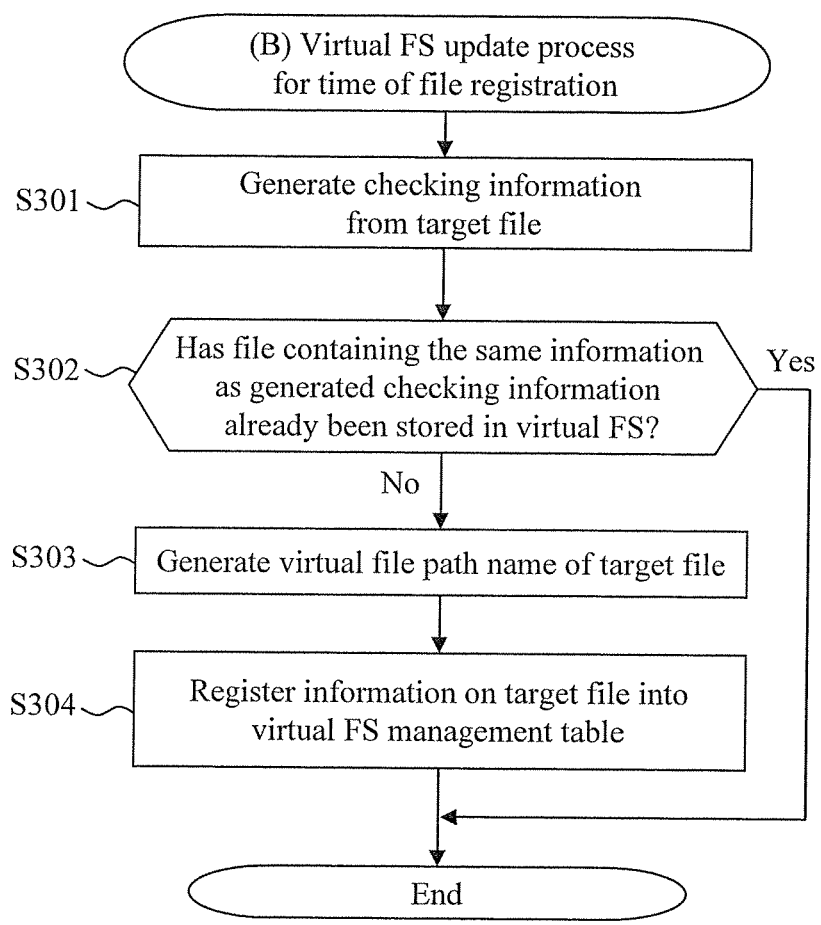
FIG. 13 is a flowchart for describing an exemplary virtual file system update process for the time of file registration.

With reference to FIG. 13, description is given of a series of processing flow in the virtual file system update process at the time of the file registration. This processing flow corresponds to the detailed processing flow of Processing Step S106 in FIG. 11. First of all, the file server 1100 generates checking information from the storage target file (Step S301). The checking information is generated in this step using the same method as the method of generating checking information for the entry of the checking information 4250 in the stored file management table 4200. Note that, in the case where similar checking information has already been generated in the previous process, that information may be utilized instead of newly generating checking information. After the generation of the checking information, the file server 1100 examines whether or not a file containing the same information as the generated checking information has already been registered in the virtual file system (Step S302). Specifically, the file server 1100 examines whether or not a file that matches the checking information generated this time exists in the entry of the checking information 4340 in the virtual file system management table 4300. If Yes in Processing Step S302, the file server 1100 determines that a file having the same contents as the contents of the registration target file has already been registered in the virtual file system, and ends this process. On the other hand, if No in Processing Step S302, the file server 1100 determines that a file having the same contents as the contents of the registration target file is not registered in the virtual file system. Under this determination, the file server 1100 generates the virtual file path name 4320 corresponding to the target file (Step S303). Next, the file server 1100 registers the information on the target file into the virtual file system management table 4300 (Step S304), and ends the process. In this step, the value of the stored file ID 4210 acquired in the previous process is registered as the corresponding stored file ID 4350 into the virtual file system management table 4300.

Figure 14:
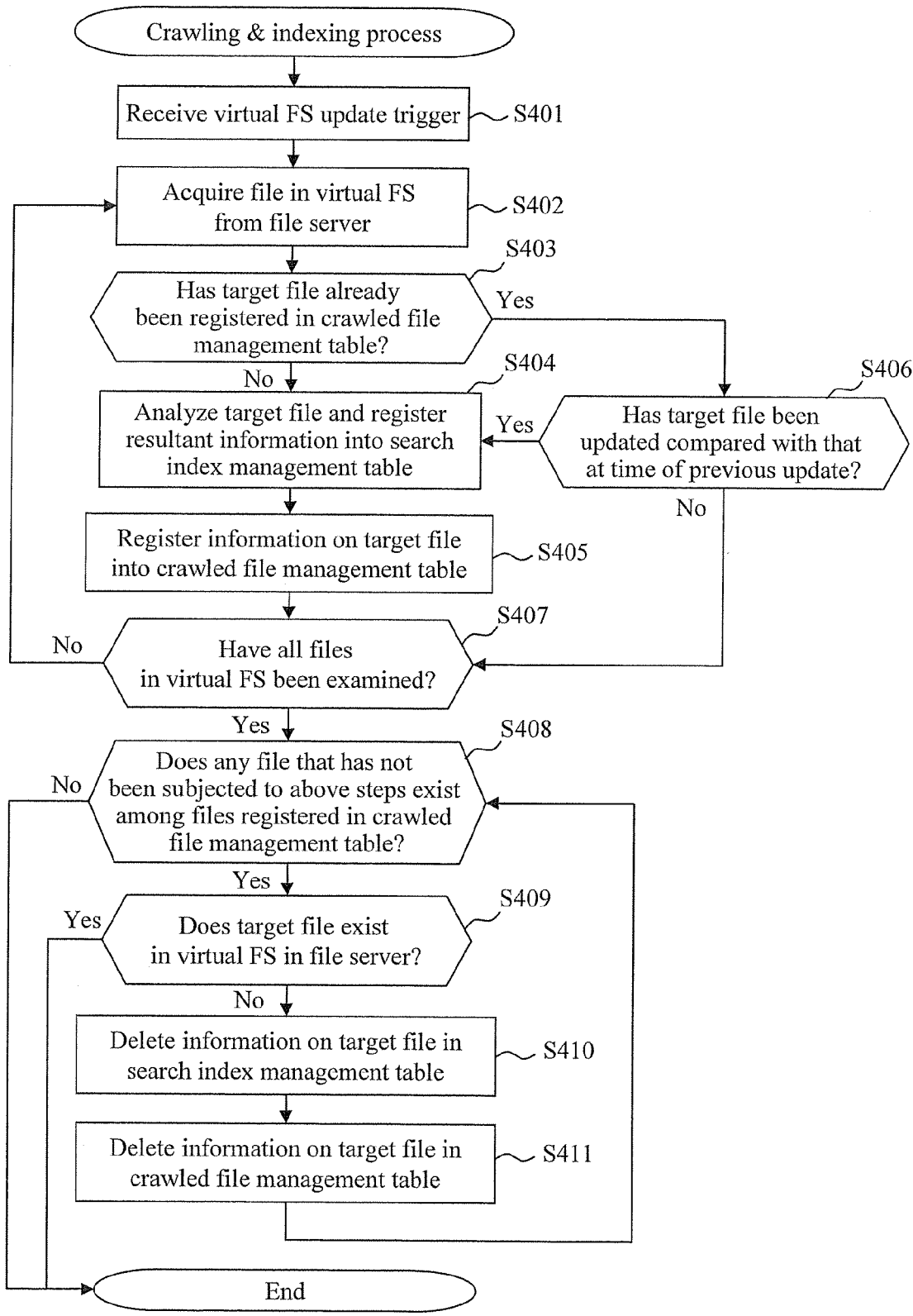
FIG. 14 is a flowchart for describing an exemplary crawling and indexing process.

With reference to FIG. 14, description is given of a series of processing flow in the crawling and indexing process. This processing flow shows processing contents that are performed by the search server 2100 after the virtual file system update trigger is transmitted in Processing Step S107 of FIG. 11. First of all, the search server 2100 receives the virtual file system update trigger transmitted from the file server 1100 (Step S401). After the trigger reception, the search server 2100 crawls the virtual file system, to thereby acquire a given file from the file server 1100 (Step S402). After the file acquisition, the search server 1100 examines whether or not the target file has already been registered in the crawled file management table 4400 (Step S403). If No in Processing Step S403, the search server 2100 analyzes the target file and registers the analysis result into the search index management table 4500 (Step S404). If Yes in Processing Step S403, the search server 2100 examines whether or not the target file has been updated compared with that at the time of the previous search index update (Step S406). If Yes in Processing Step S406, the search server 2100 goes to Processing Step S404. If No in Processing Step S406, the search server 2100 goes to Processing Step S407 to be described later.

After Processing Step S404, the search server 2100 registers the information on the target file into the crawled file management table 4400 (Step S405). After that, the search server checks whether or not all the files in the virtual file system have been examined (Step S407). Specifically, the search server 2100 examines whether or not a file that has not been crawled by the search server still remains in the virtual file system. If No in Processing Step S407, a file to be crawled still remains, and hence the search server 2100 goes back to Processing Step S402 to repeat the process. On the other hand, if Yes in Processing Step S407, a file to be crawled does not remain anymore, and hence the search server 2100 performs the following process.

The search server 2100 examines whether or not a file that has not been subjected to the above steps exists among the files registered in the crawled file management table 4400 (Step S408). Specifically, the search server 2100 examines whether or not a file that is registered in the crawled file management table 4400 but has not been subjected to Processing Steps S402 to S407 exists thereamong. If No in Processing Step S408, the search server 2100 ends this process. On the other hand, if Yes in Processing Step S408, the search server 2100 determines the possibility that any file in the virtual file system has been deleted since the previous search index update, and performs the following process therefor.

The search server 2100 examines whether or not the target file exists in the virtual file system in the file server 1100 (Step S409). If Yes in Processing Step S409, the search server 2100 determines that the indexing process on the target file has already been performed in Processing Steps S402 to S407, and ends this process. On the other hand, if No in Processing Step S409, the search server 2100 deletes the information on the target file in the search index management table 4500 (Step S410). After the deletion thereof, the search server 2100 deletes the information on the target file in the crawled file management table 4400 (Step S411). After the deletion thereof, the search server 2100 goes to Processing Step S408 to continuously perform the same process.

Figure 15:
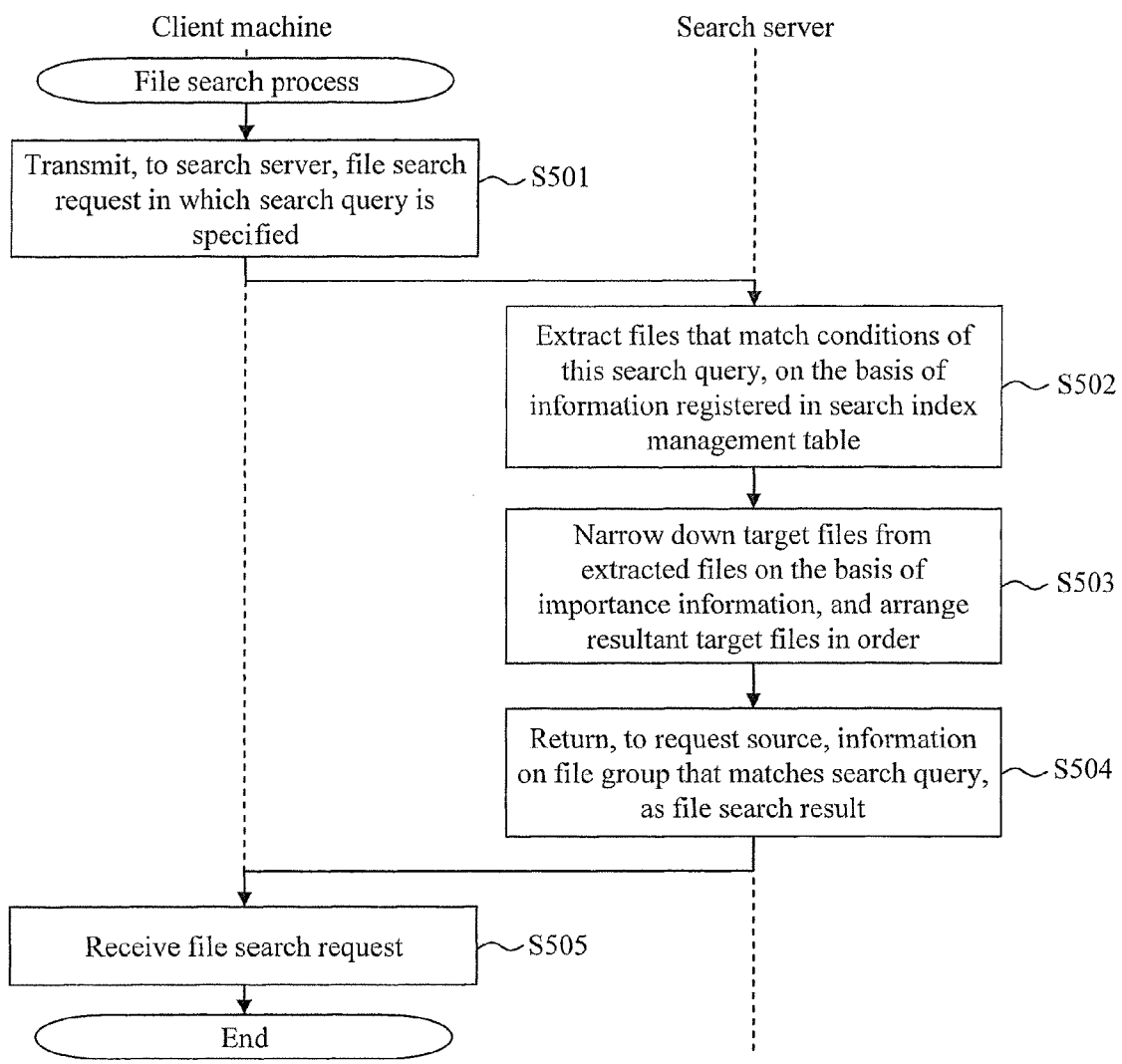
FIG. 15 is a flowchart for describing an exemplary file search process.

With reference to FIG. 15, description is given of a series of processing flow in the file search process. First of all, the client machine 3100 transmits, to the search server 2100, a file search request in which a search query is specified (Step S501). The search query specified in this step includes a character string and the like included in a file to be searched for. Next, the search server 2100 receives the search request and extracts files that match conditions of the search query, on the basis of the information registered in the search index management table 4500 (Step S502). Specifically, the search server 2100 examines whether or not a search character string specified in the search query is coincident with a character string registered in the section of the keyword 4510 in the search index management table 4500, and extracts coincident entries. After the extraction thereof, the search server 2100 narrows down target files from the extracted files on the basis of the importance information 4523 contained in each extracted entry in the search index management table 4500, and arranges the resultant target files in order (Step S503). Specifically, the search server 2100 calculates the value of importance of each extracted file, and excludes an extracted file whose value of importance is smaller than a prescribed value, from the search result. Further, the search server 2100 arranges the extracted files in descending order of the value of importance from the remaining extracted file group. Next, the search server 2100 returns, to the request source, the result obtained in Processing Step S503, that is, information on the file group that matches the search query, as the file search result (Step S504). Lastly, the client machine 3100 receives the file search result from the search server 2100 (Step S505), and ends the process.

Figure 16:
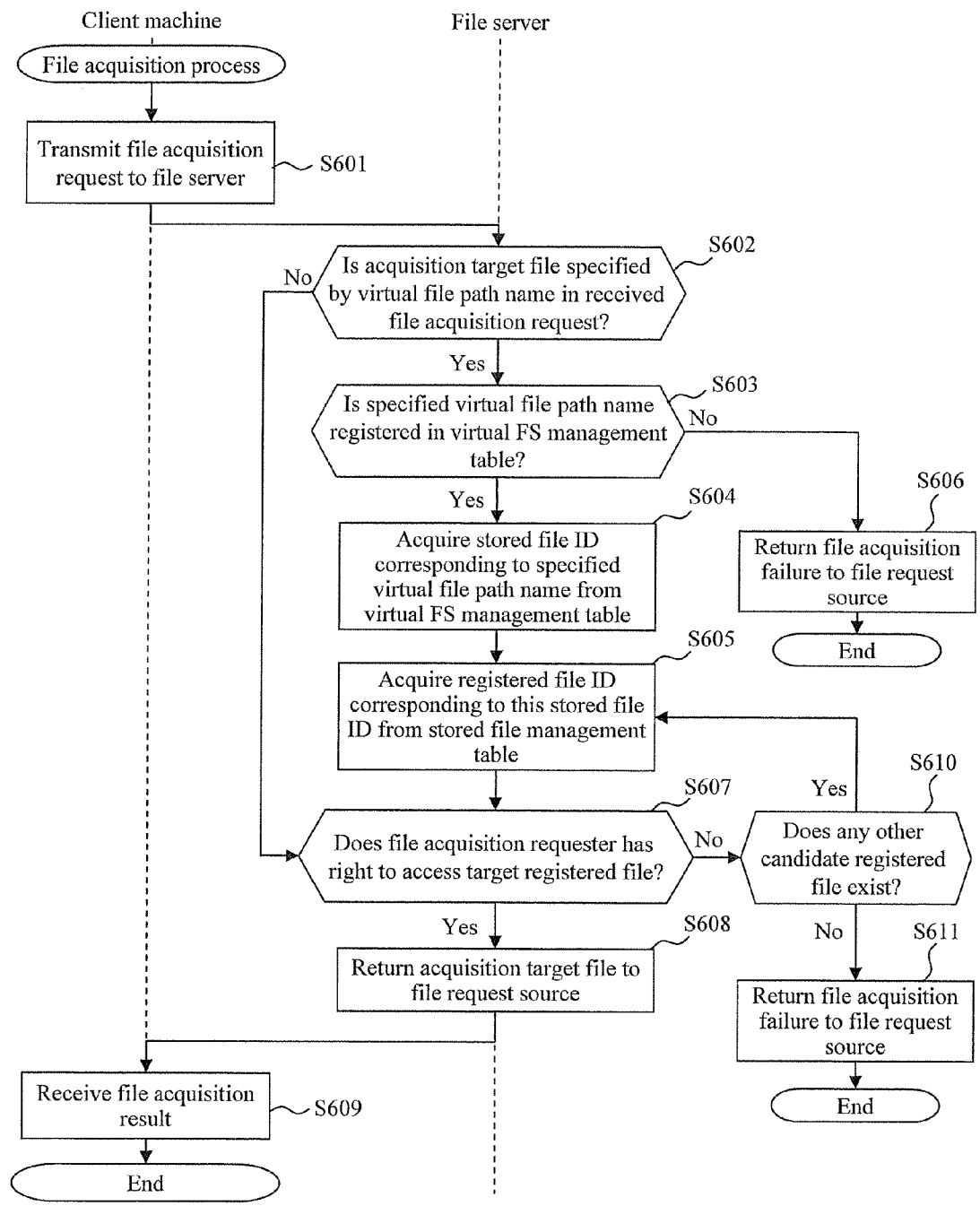
FIG. 16 is a flowchart for describing an exemplary file acquisition process.

With reference to FIG. 16, description is given of a series of processing flow in the file acquisition process. This processing flow shows processing contents when the client machine 3100 selects an acquisition target file on the basis of the file search result acquired in the file search process in FIG. 15, and requests the file acquisition of the file server 1100 using a file path name included in the search result.

First of all, the client machine 3100 transmits, to the file server 1100, a file acquisition request in which the file path name of the acquisition target file is specified (Step S601). The file path name that is used in this step by the client machine 3100 in order to specify the acquisition target file is the virtual file path name in the virtual file system 1172 provided by the file server 1100. The reason why the file path name used in this step is the virtual file path name is that the search server 2100 crawls the virtual file system 1172 to create the search index 2101, and the virtual file path name is therefore used in the search result provided by the search server 2100. Next, the file server 1100 receives the file acquisition request, and examines whether or not the acquisition target file is specified by the virtual file path name in the received target file acquisition request (Step S602). In this process, it is necessary to enable the file server 1100 to uniquely discriminate the virtual file path name from other file path names. Accordingly, identification information unique to the virtual file path name is given to the virtual file path name. For example, it is conceivable to give a special name to a root directory name of the file system. If Yes in Processing Step S602, the file server 1100 examines whether or not the specified virtual file path name is registered in the virtual file system management table 4300 (Step S603). If No in Processing Step S603, the file server 1100 determines that the file acquisition request has an inappropriate virtual file name, returns a file acquisition failure to the file request source (Step S606), and ends the process. On the other hand, if Yes in Processing Step S603, the file server 1100 acquires the stored file ID corresponding to the specified virtual file path name from the virtual file system management table 4300 (Step S604). Specifically, the file server 1100 searches the virtual file system management table 4300 for an entry in which the path name registered in the section of the virtual file path name 4320 is coincident with the specified virtual file path name. After that, the file server 1100 acquires the stored file ID registered in the section of the corresponding stored file ID 4350 of this entry. After the acquisition of the stored file ID, the file server 1100 acquires the registered file ID corresponding to the acquired stored file ID from the stored file management table 4200 (Step S605). Specifically, the file server 1100 searches the stored file management table 4200 for an entry in which the path name registered in the section of the stored file path name 4220 is coincident with the stored file path name. After that, the file server 1100 acquires the registered file ID registered in the section of the corresponding registered file ID 4260 of this entry. After the acquisition of the registered file ID, the file server 1100 examines whether or not the file acquisition requester has the right to access the target registered file (Step S607). Specifically, the file server 1100 searches the registered file management table 4100 for an entry in which the file ID registered in the section of the registered file ID 4110 is coincident with the acquired registered file ID. After that, the file server 1100 acquires access right information such as an access control list (ACL) for the file, the access right information being registered in the metadata 4130 of the registered file of this entry. After that, the file server 1100 examines whether or not the user who requests this file acquisition process has the right to access the target registered file.

If Yes in Processing Step S607, the file server 1100 determines that the file acquisition requester has the access right, and returns the target registered file as the acquisition target file to the file request source (Step S608). After that, the client machine 3100 receives the file acquisition result from the file server (Step S609), and ends the process. On the other hand, if No in Processing Step S607, the file server 1100 determines that the file acquisition requester does not have the access right, and examines whether or not any other candidate registered file corresponding to the acquisition target file exists (Step S610). Specifically, the file server 1100 performs the same process as that in Processing Step S605. If a plurality of such registered files exit, these files can be regarded as other candidate registered files. If Yes in Processing Step S610, the file server 1100 goes to Processing Step S605. Then, the file server 1100 acquires the registered file IDs of the other candidate registered files, and can perform the same access right determination process again. On the other hand, if No in Processing Step S610, the file server 1100 determines that the file acquisition request is made to the file without the access right, returns a file acquisition failure to the file request source (Step S611), and ends the process.

Further, if No in Processing Step S602, the file server 1100 determines that the file acquisition request is made using the registered file path name in the registered file system 1170, and goes to Processing Step S607. Hereafter, the file server 1100 performs a process similar to the file acquisition process in a normal file service using the registered file system 1170.

Figure 17:
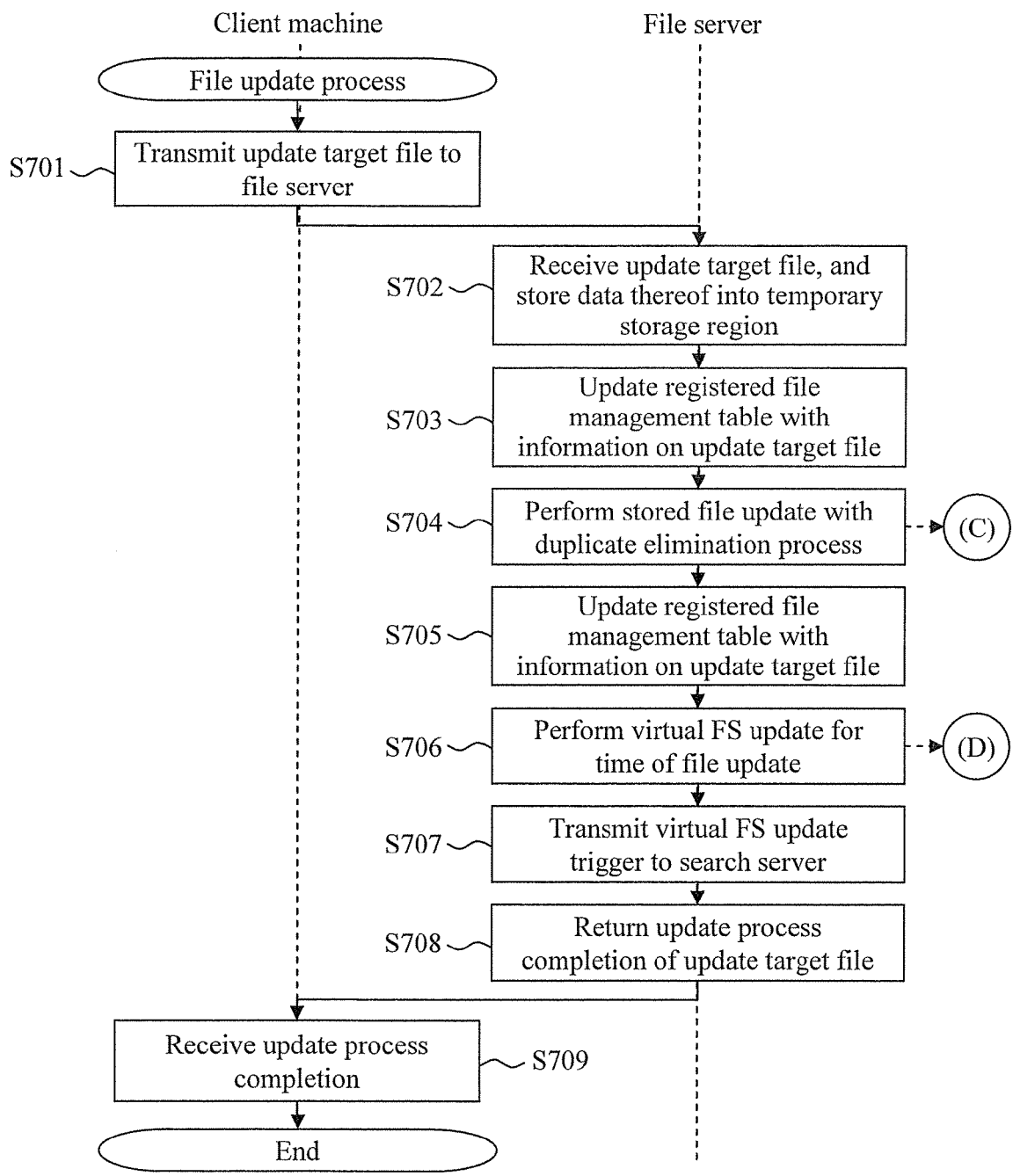
FIG. 17 is a flowchart for describing an exemplary file update process.

With reference to FIG. 17, description is given of a series of processing flow in the file update process. This processing flow is substantially the same processing flow as the file registration process in FIG. 11.

First of all, the client machine 3100 transmits an update target file to the file server 1100 (Step S701). Next, the file server 1100 receives the update target file transmitted from the client machine 3100, and stores data thereof into a temporary storage region in the file server 1100 (Step S702). Next, the file server 1100 updates the registered file management table 4100 with information on the update target file (Step S703). Note that, in this step, the registered file management table 4100 is not updated with information on the corresponding stored file ID 4140. Next, the file server 1100 performs the stored file update process with the duplicate elimination process on the update target file (Step S704). The stored file update process with the duplicate elimination process is described later in detail. Next, the file server 1100 updates the section of the corresponding stored file ID 4140 in the registered file management table 4100, with the value of the stored file ID 4210 stored in Processing Step S704 (Step S705). Next, the file server 1100 performs the virtual file system update process for the time of the file update (Step S706). The virtual file system update process is described later in detail. After the end of the virtual file system update process, the file server 1100 transmits a virtual file system update trigger to the search server 2100 (Step S707). Upon the reception of this trigger, the search server 2100 starts a search index update process. After the transmission of the trigger, the file server 1100 returns an update process completion of the update target file to the client machine 3100 as the request source (Step S708). Lastly, the client machine 3100 receives the update process completion transmitted from the file server 1100 (Step S709), and ends the process.

Figure 18:
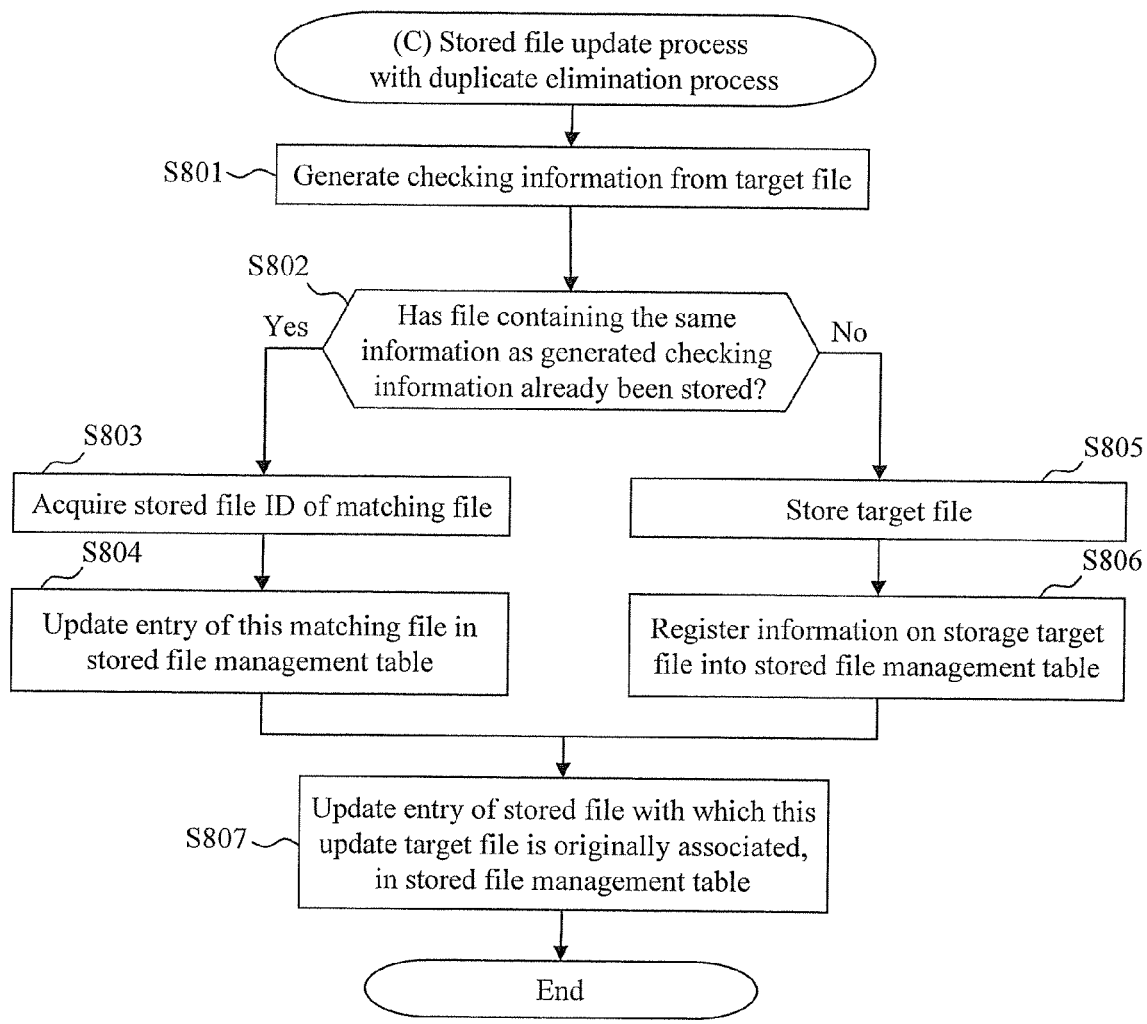
FIG. 18 is a flowchart for describing an exemplary stored file update process with a duplicate elimination process.

With reference to FIG. 18, description is given of a series of processing flow in the stored file update process with the duplicate elimination process. This processing flow corresponds to the detailed processing flow of Processing Step S704 in FIG. 17. In addition, this processing flow is substantially the same processing flow as the file storage process with the duplicate elimination process in FIG. 12.

First of all, the file server 1100 generates checking information from the update target file of this time (Step S801). The checking information is generated in this step using the same method as the method of generating checking information for the entry of the checking information 4250 in the stored file management table 4200. After the generation of the checking information, the file server 1100 examines whether or not a file containing the same information as the generated checking information has already been stored (Step S802). Specifically, the file server 1100 examines whether or not a file that matches the checking information generated this time exists in the entry of the checking information 4250 in the stored file management table 4200. If Yes in Processing Step S802, the file server 1100 acquires the stored file ID 4210 of the matching file from the stored file management table 4200 (Step S803). Next, the file server 1100 updates the entry of the matching file in the stored file management table 4200 (Step S804). Specifically, the file server 1100 increases the duplicate reference file count 4240 of this entry, and adds and registers the registered file ID 4110 of the registered file into the section of the corresponding registered file ID 4260. Lastly, the file server 1100 updates the entry of the stored file with which the update target file is originally associated, in the stored file management table 4200 (Step S807), and ends the process. Specifically, in the course of the file update process, the associated stored file becomes different between the registered file before the update and the registered file after the update. Accordingly, the file server 1100 finds out the entry of the stored file with which the registered file before the update is associated, from the stored file management table 4200. Then, the file server 1100 subtracts the value of the duplicate reference file count 4240 of this entry, and deletes the registered file ID of the registered file before the update from the section of the corresponding registered file ID 4260.

On the other hand, if No in Processing Step S802, the file server 1100 determines that a file having contents that overlap with the contents of the target file is not stored, and stores the target file (Step S805). After the storage thereof, the file server 1100 registers information on the storage target file into the stored file management table 4200 (Step S806). Lastly, the file server 1100 performs Processing Step S807 described above, and ends the process.

Figure 19:
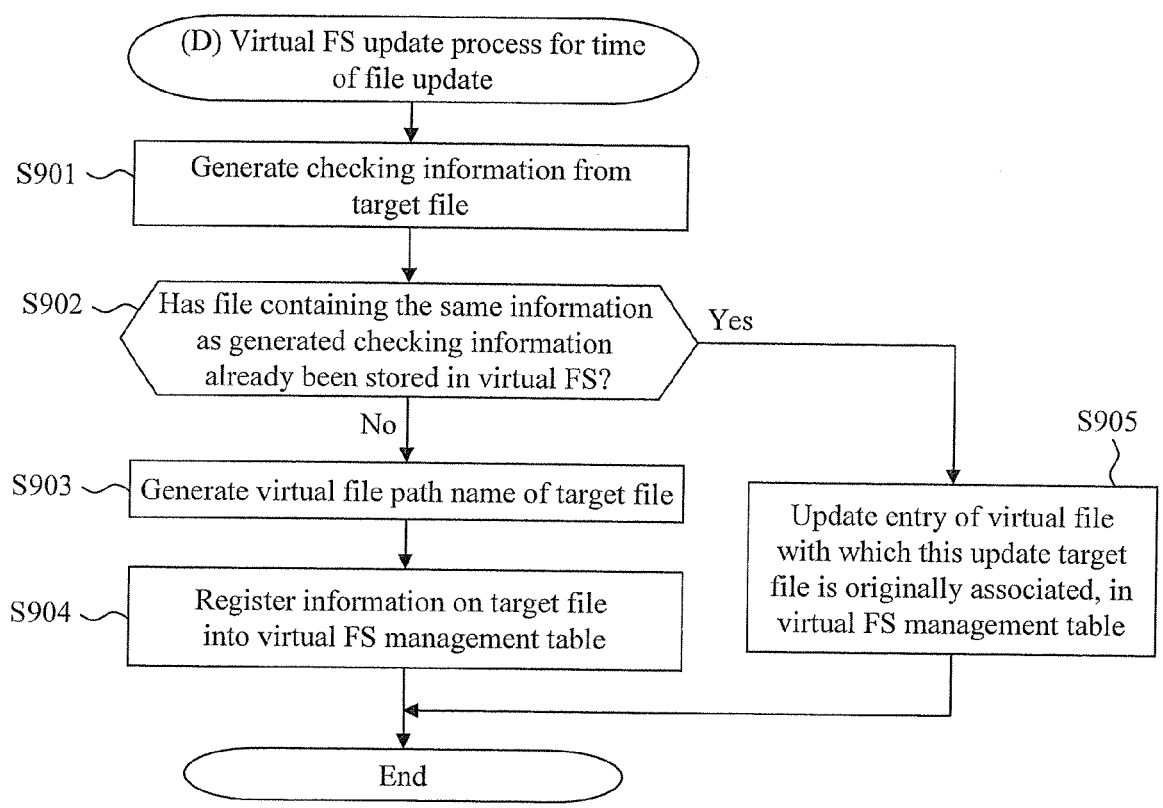
FIG. 19 is a flowchart for describing an exemplary virtual file system update process for the time of file update.

With reference to FIG. 19, description is given of a series of processing flow in the virtual file system update process at the time of the file update. This processing flow corresponds to the detailed processing flow of Processing Step S706 in FIG. 17. In addition, this processing flow is substantially the same processing flow as the file storage process with the duplicate elimination process in FIG. 13.

First of all, the file server 1100 generates checking information from the storage target file (Step S901). The checking information is generated in this step using the same method as the method of generating checking information for the entry of the checking information 4250 in the stored file management table 4200. Note that, in the case where similar checking information has already been generated in the previous process, that information may be utilized instead of newly generating checking information. After the generation of the checking information, the file server 1100 examines whether or not a file containing the same information as the generated checking information has already been registered in the virtual file system (Step S902). Specifically, the file server 1100 examines whether or not a file that matches the checking information generated this time exists in the entry of the checking information 4340 in the virtual file system management table 4300. If Yes in Processing Step S902, the file server 1100 updates the entry of the virtual file with which the update target file is originally associated, in the virtual file system management table 4300 (Step S905), and ends the process. Specifically, similarly to the description of FIG. 18, in the course of the file update process, the associated virtual file becomes different between the registered file before the update and the registered file after the update. Accordingly, the file server 1100 finds out the entry of the stored file with which the registered file before the update is associated, from the stored file management table 4200, and acquires the stored file ID corresponding thereto. After that, the file server 1100 finds out the entry of the virtual file with which the found stored file is associated, from the virtual file system management table 4300. After that, the file server 1100 updates the section of the corresponding stored file ID 4350 of this entry from the stored file ID with which the registered file before the update is associated to the stored file ID with which the registered file after the update is associated.

On the other hand, if No in Processing Step S902, the file server 1100 determines that a file having the same contents as the contents of the update target file is not registered in the virtual file system. Under this determination, the file server 1100 generates the virtual file path name 4320 corresponding to the target file (Step S903). Next, the file server 1100 registers the information on the target file into the virtual file system management table 4300 (Step S904), and ends the process. In this step, the value of the stored file ID 4210 acquired in the previous process is registered as the corresponding stored file ID 4350 into the virtual file system management table 4300.

Figure 20:
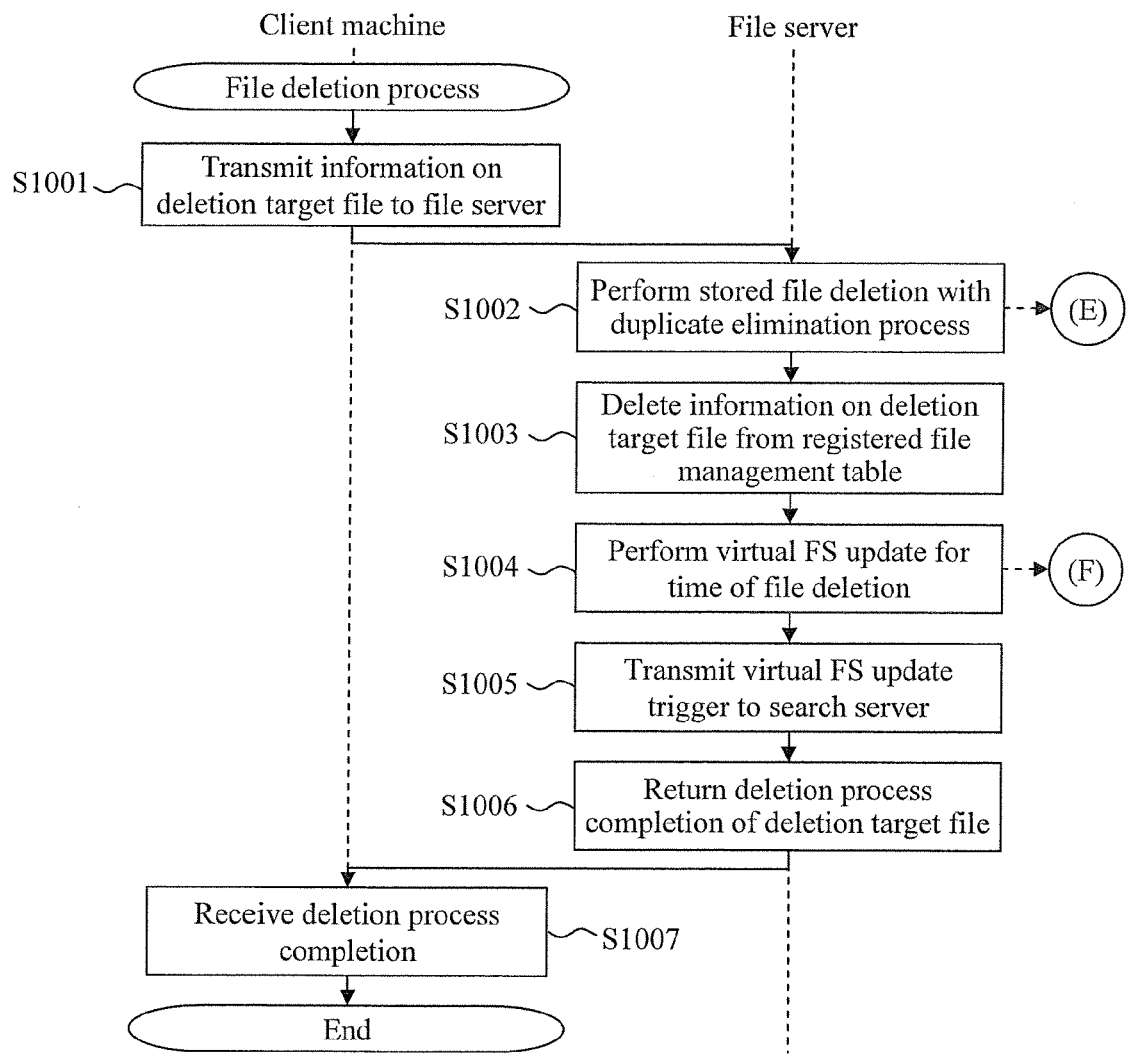
FIG. 20 is a flowchart for describing an exemplary file deletion process.

With reference to FIG. 20, description is given of a series of processing flow in the file deletion process. This processing flow is substantially the same processing flow as the file registration process in FIG. 11.

First of all, the client machine 3100 transmits information on a deletion target file to the file server 1100 (Step S1001). Next, the file server 1100 receives the information on the deletion target file transmitted from the client machine 3100, and performs the stored file deletion process with the duplicate elimination process on the deletion target file (Step S1002). The stored file deletion process with the duplicate elimination process is described later in detail. Next, the file server 1100 deletes the information on the deletion target file from the registered file management table 4100 (Step S1003). Next, the file server 1100 performs the virtual file system update process for the time of the file deletion (Step S1004). The virtual file system update process for the time of the file deletion is described later in detail. After the end of the virtual file system update, the file server 1100 transmits a virtual file system update trigger to the search server 2100 (Step S1005). Upon the reception of this trigger, the search server 2100 starts a search index update process. After the transmission of the trigger, the file server 1100 returns a deletion process completion of the deletion target file to the client machine 3100 as the request source (Step S1006). Lastly, the client machine 3100 receives the deletion process completion transmitted from the file server 1100 (Step S1007), and ends the process.

Figure 21:
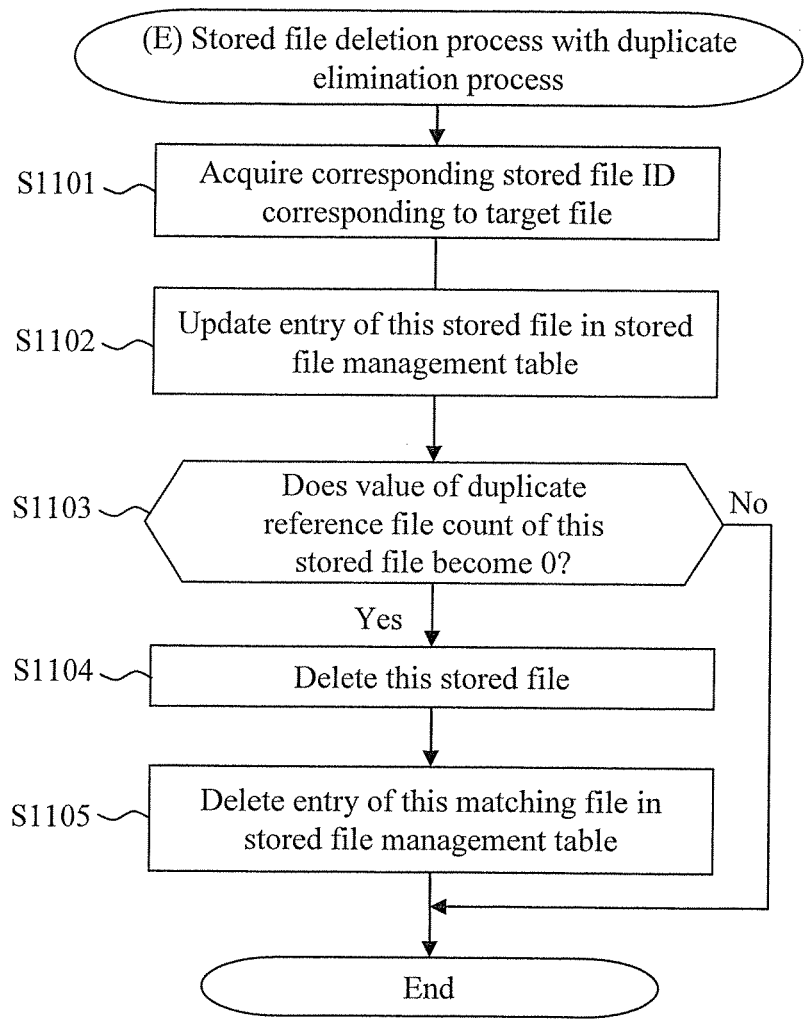
FIG. 21 is a flowchart for describing an exemplary stored file deletion process with a duplicate elimination process.
Figure 22:
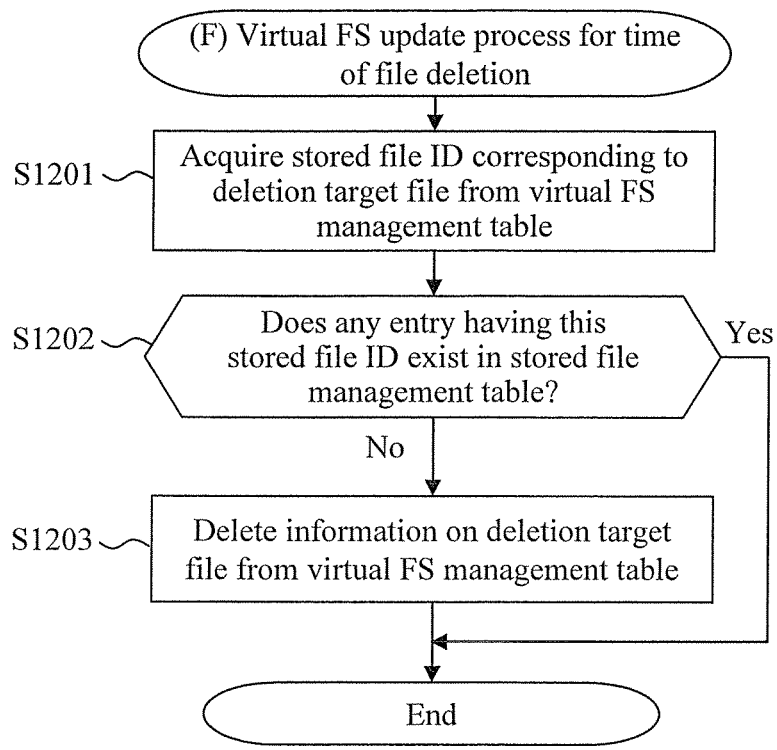
FIG. 22 is a flowchart for describing an exemplary virtual file system update process for the time of file deletion.

With reference to FIG. 21, description is given of a series of processing flow in the stored file deletion process with the duplicate elimination process. This processing flow corresponds to the detailed processing flow of Processing Step S1002 in FIG. 20.

First of all, the file server 1100 acquires the stored file ID corresponding to the deletion target file (Step S1101). Specifically, the file server 1100 searches the registered file management table 4100 for the entry of the registered file specified as a deletion target, and acquires the value of the corresponding stored file ID 4140 of this entry. After that, the file server 1100 updates the entry of the stored file in the stored file management table 4200 (Step S1102). Specifically, the file server 1100 searches the stored file management table 4200 for the entry in which the stored file ID acquired in Processing Step S1101 is registered. After that, the file server 1100 subtracts the value of the duplicate reference file count 4240 of this entry, and deletes the registered file ID of the target registered file specified this time as a deletion target, from the section of the corresponding registered file ID 4260 of this entry. After the update of the entry in the stored file management table 4200, the file server 1100 examines whether or not the value of the duplicate reference file count 4240 of the stored file is 0 (Step S1103). Specifically, the file server 1100 examines whether or not the value of the duplicate reference file count 4240 of the entry found in Processing Step S1102 is 0. If Yes in Processing Step S1103, the file server 1100 determines that no registered file refers to the target stored file anymore, and deletes the stored file (Step S1104). After the deletion thereof, the file server 1100 deletes the entry of the stored file in the stored file management table 4200 (Step S1105), and ends the process.

On the other hand, if No in Processing Step S1103, the file server 1100 determines that the deletion of the target stored file is not necessary at the current moment, and ends the process.

With reference to FIG. 22, description is given of a series of processing flow in the virtual file system update process at the time of the file deletion. This processing flow corresponds to the detailed processing flow of Processing Step S1004 in FIG. 20.

First of all, the file server 1100 acquires the stored file ID corresponding to the deletion target file from the virtual file system management table 4300 (Step S1201). Specifically, the file server 1100 searches the registered file management table 4100 for the entry of the registered file specified as a deletion target, and acquires the value of the corresponding stored file ID 4140 of this entry. After that, the file server 1100 examines whether or not any entry having the acquired stored file ID exists in the stored file management table 4200 (Step S1202). Specifically, the file server 1100 examines whether or not any entry in which the stored file ID acquired in Processing Step S1201 is registered exists in the stored file management table 4200.

If Yes in Processing Step S1202, the file server 1100 determines that the stored file has not been deleted in the file deletion process of this time, that is, the update of the virtual file system 1172 is not necessary, and ends the process.

On the other hand, if No in Processing Step S1202, the file server 1100 determines that the stored file has been deleted in the file deletion process of this time, that is, the update of the virtual file system 1172 is necessary. Then, the file server 1100 deletes the information on the deletion target file from the virtual file system management table 4300 (Step S1203), and ends the process. Specifically, the file server 1100 examines whether or not any entry in which the stored file ID acquired in Processing Step S1201 is registered exists in the section of the corresponding stored file ID 4350 in the virtual file system management table 4300. If such an entry exists, the file server 1100 deletes this entry from the virtual file system management table 4300.

Hereinabove, Embodiment 1 of the present invention has been described. It goes without saying that the present invention is not limited to Embodiment 1 and thus can be variously modified within a range not departing from the gist thereof.

Embodiment 2

In Embodiment 1 described above, the file registration process, the file storage process with the duplicate elimination process, and the virtual file system update process in the file server 1100 are synchronously executed. Not limited thereto, the file server 1100 may execute the file registration process asynchronously to the two subsequent processes. If these processes are asynchronously executed, the file server 1100 can make shorter the time of response to the client machine 3100 that requests the file registration, and can execute the file storage process and the virtual file system update process in accordance with load conditions in the file server 1100. In view of the above, description is given below, as Embodiment 2, of a control method in which the file registration process and the subsequent processes in the file server 1100 are asynchronously executed.

Figure 23:
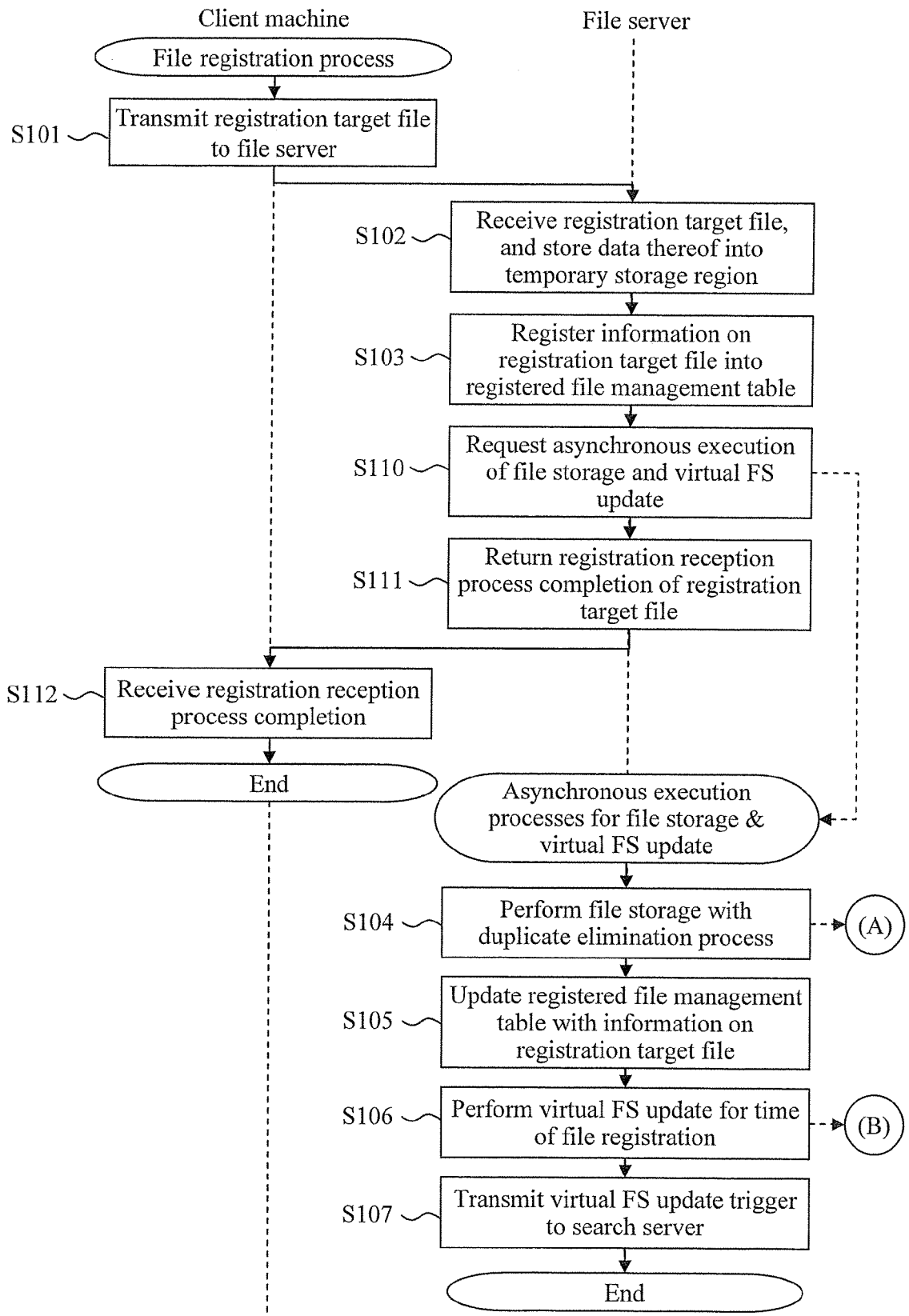
FIG. 23 is a flowchart for describing an exemplary file registration process according to Embodiment 2.

For such asynchronous execution as described above, it is necessary to change part of the contents of the file registration process. With reference to FIG. 23, the changed contents thereof are described. Note that the changed contents of the file registration process are described here, but a similar change is necessary also for the file update process and the file deletion process. The changed contents of these processes are the same as the changed contents of the file registration process, and hence description thereof is omitted here.

With reference to FIG. 23, the changed contents of the file registration process are described. Compared with the file registration process described in FIG. 11, in this processing flow, the file server 1100 synchronously returns a registration process reception completion to the client machine 3100 just by registering the information on the registration target file into the registered file management table 4100, and asynchronously executes the other processes. Specific description thereof is given below.

First of all, after performing the processing steps from the beginning to S103 of the file registration process in FIG. 11, the file server 1100 requests asynchronous execution of the file storage process and the virtual file system update process (Step S110). This request is received by the file management control program 1124 in the file server 1100. The received request is executed at appropriate timing as asynchronous execution processes for file storage and virtual file system update in the file server 1100.

In the asynchronous execution processes for file storage and virtual file system update, the file server 1100 sequentially executes Processing Steps S104, S105, S106, and S107 of the file registration process in FIG. 11.

After Processing Step S110, the file server 1100 returns the registration reception process completion of the registration target file to the client machine 3100 (Step S111). After that, the client machine 3100 receives the registration reception process completion (Step S112), and ends the process. Note that this return simply means the reception of the registration process. Accordingly, this return does not guarantee that the registration target file is stored into the stored file system and is reflected to the virtual file system in the file server 1100.

Through the above-mentioned process, the file storage process and the virtual file system update process can be performed asynchronously to the file registration process.

Note that only the virtual file system update process may be executed asynchronously to the file registration process, and the file storage process with the duplicate elimination process may be executed synchronously to the file registration process.

Embodiment 3

In Embodiment 1 described above, the file registration process, the file storage process with the duplicate elimination process, and the virtual file system update process in the file server 1100 are synchronously executed. Not limited thereto, the file server 1100 may execute the file registration process, the file storage process, and the virtual file system update process asynchronously to one another. If these processes are asynchronously executed, the file server 1100 can make shorter the time of response to the client machine 3100 that requests the file registration. Further, the file server 1100 can execute the file storage process and the virtual file system update process in accordance with load conditions in the file server 1100, more flexibly than in Embodiment 2. In view of the above, description is given below, as Embodiment 3, of a control method in which the file registration process, the file storage process, and the virtual file system update process in the file server 1100 are asynchronously executed.

Figure 24:
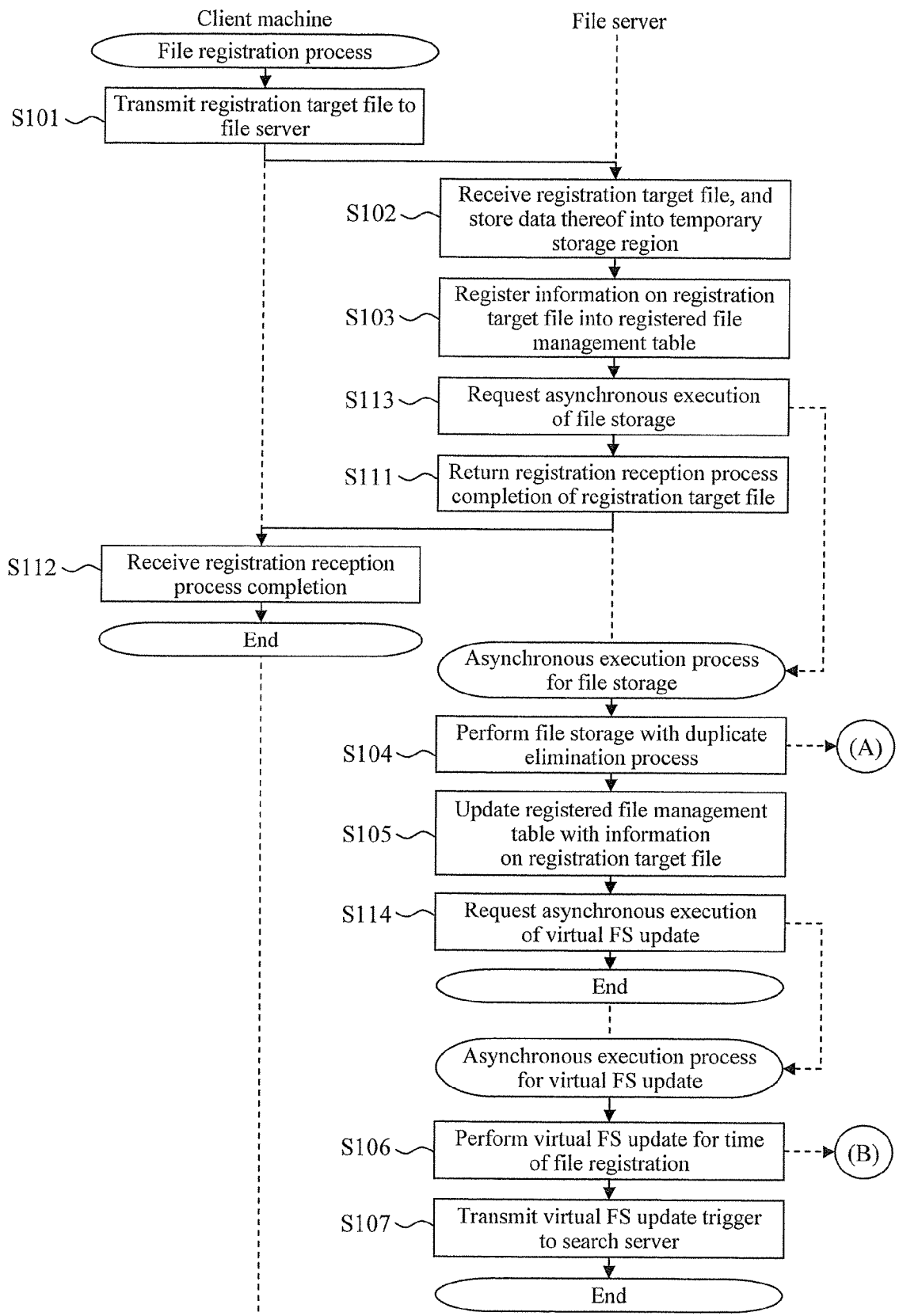
FIG. 24 is a flowchart for describing an exemplary file registration process according to Embodiment 3.

For such asynchronous execution as described above, it is necessary to change part of the contents of the file registration process. With reference to FIG. 24, the changed contents thereof are described. Note that the changed contents of the file registration process are described here, but a similar change is necessary also for the file update process and the file deletion process. The changed contents of these processes are the same as the changed contents of the file registration process, and hence description thereof is omitted here.

With reference to FIG. 24, the changed contents of the file registration process are described. Compared with the file registration process described in FIG. 11, in this processing flow, the file server 1100 synchronously returns a registration process reception completion to the client machine 3100 just by registering the information on the registration target file into the registered file management table 4100, and executes the other two processes asynchronously to each other. Specific description thereof is given below.

First of all, after performing the processing steps from the beginning to S103 of the file registration process in FIG. 11, the file server 1100 requests asynchronous execution of the file storage process (Step S113). This request is received by the file management control program 1124 in the file server 1100. The received request is executed at appropriate timing as an asynchronous execution process for file storage in the file server 1100.

In the asynchronous execution process for file storage, the file server 1100 sequentially executes Processing Steps S104 and S105 of the file registration process in FIG. 11. After that, the file server 1100 requests asynchronous execution of the virtual file system update process (Step S114). This request is received by the file management control program 1124 in the file server 1100. The received request is executed at appropriate timing as an asynchronous execution process for virtual file system update in the file server 1100. In the asynchronous execution process for virtual file system update, the file server 1100 sequentially executes Processing Steps S106 and S107 of the file registration process in FIG. 11.

After Processing Step S113 described above, the file server 1100 returns the registration reception process completion of the registration target file to the client machine 3100 (Step S111). After that, the client machine 3100 receives the registration reception process completion (Step S112), and ends the process. Note that this return simply means the reception of the registration process. Accordingly, this return does not guarantee that the registration target file is stored into the stored file system and is reflected to the virtual file system in the file server 1100.

Through the above-mentioned process, the file registration process, the file storage process, and the virtual file system update process can be performed asynchronously to one another.

Embodiment 4

In Embodiment 1 described above, the search server 2100 crawls the virtual file system 1172 in the file server 1100 to thereby create the search index 2101. In such an embodiment, files for which the search index is to be created can be accessed only as virtual files via the virtual file system 1172 from the search server 2100. In this case, information of metadata given to a registered file associated to each of these virtual files is difficult to access from the search server. For example, the access right information set for the registered file cannot be acquired. Accordingly, it is difficult for the search server 2100 to narrow down files to be included in the search result to only files with the access right, on the basis of the access right information set for the target file. Accordingly, the file server 1100 needs to be provided with means for enabling the search server 2100 to acquire, via the virtual file system, the metadata of the registered file associated to each virtual file as the search target file. In view of the above, description is given below, as Embodiment 4, of a control method concerning a metadata acquisition process for a duplicate elimination file in the file server 1100.

Figure 25:
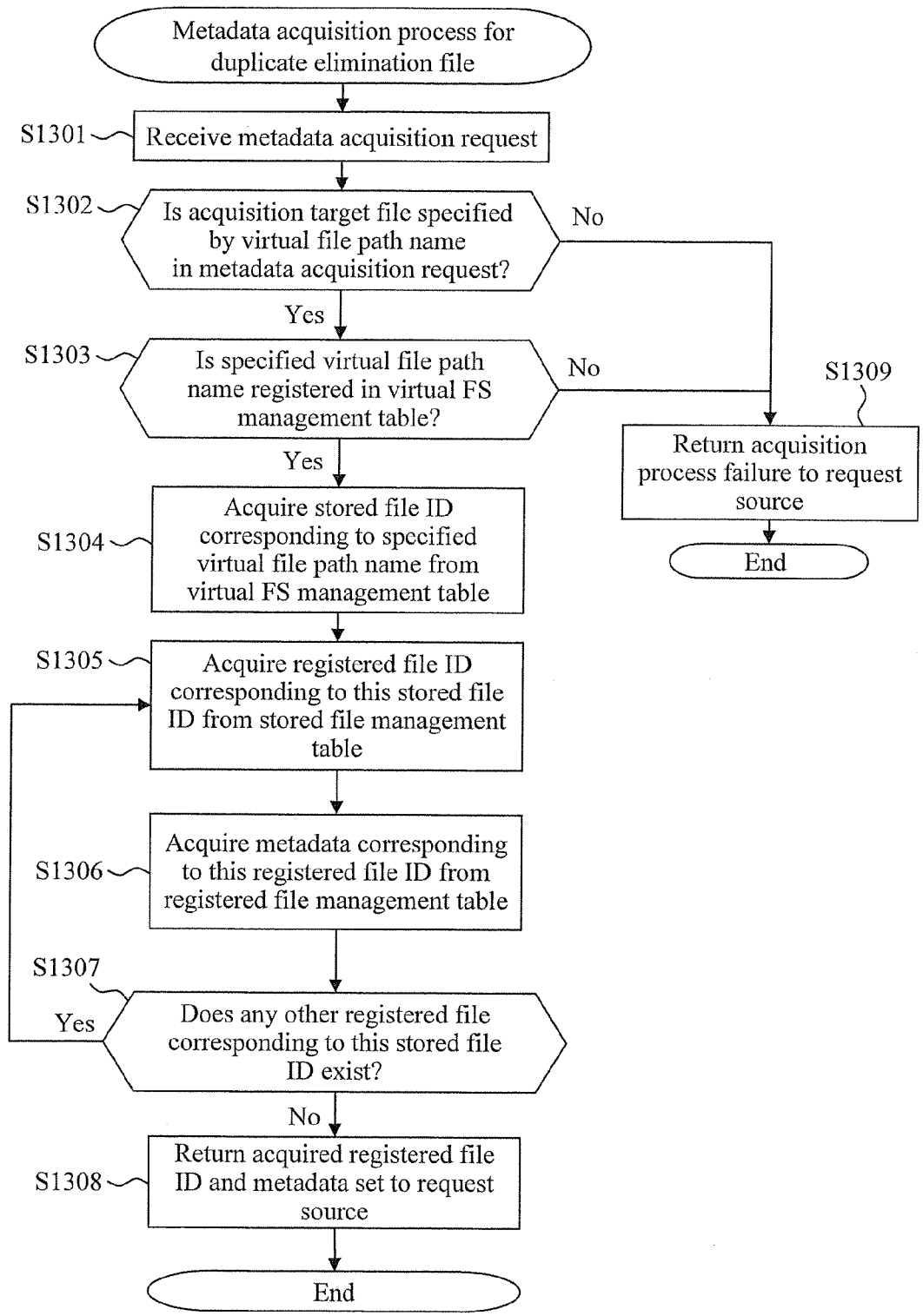
FIG. 25 is a flowchart for describing an exemplary metadata acquisition process for a duplicate elimination file according to Embodiment 4.
Figure 26:
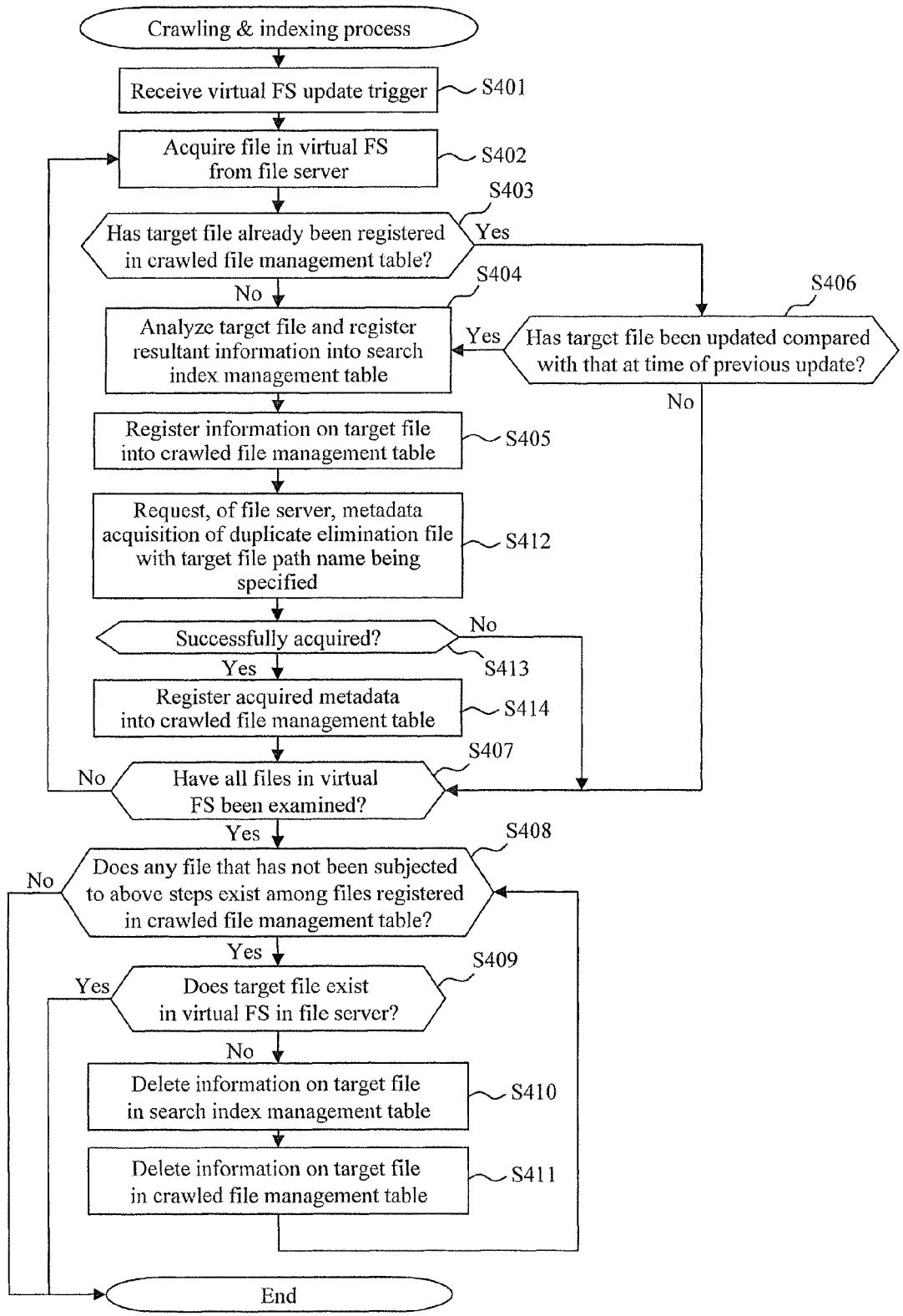
FIG. 26 is a flowchart for describing an exemplary crawling and indexing process according to Embodiment 4.
Figure 27:
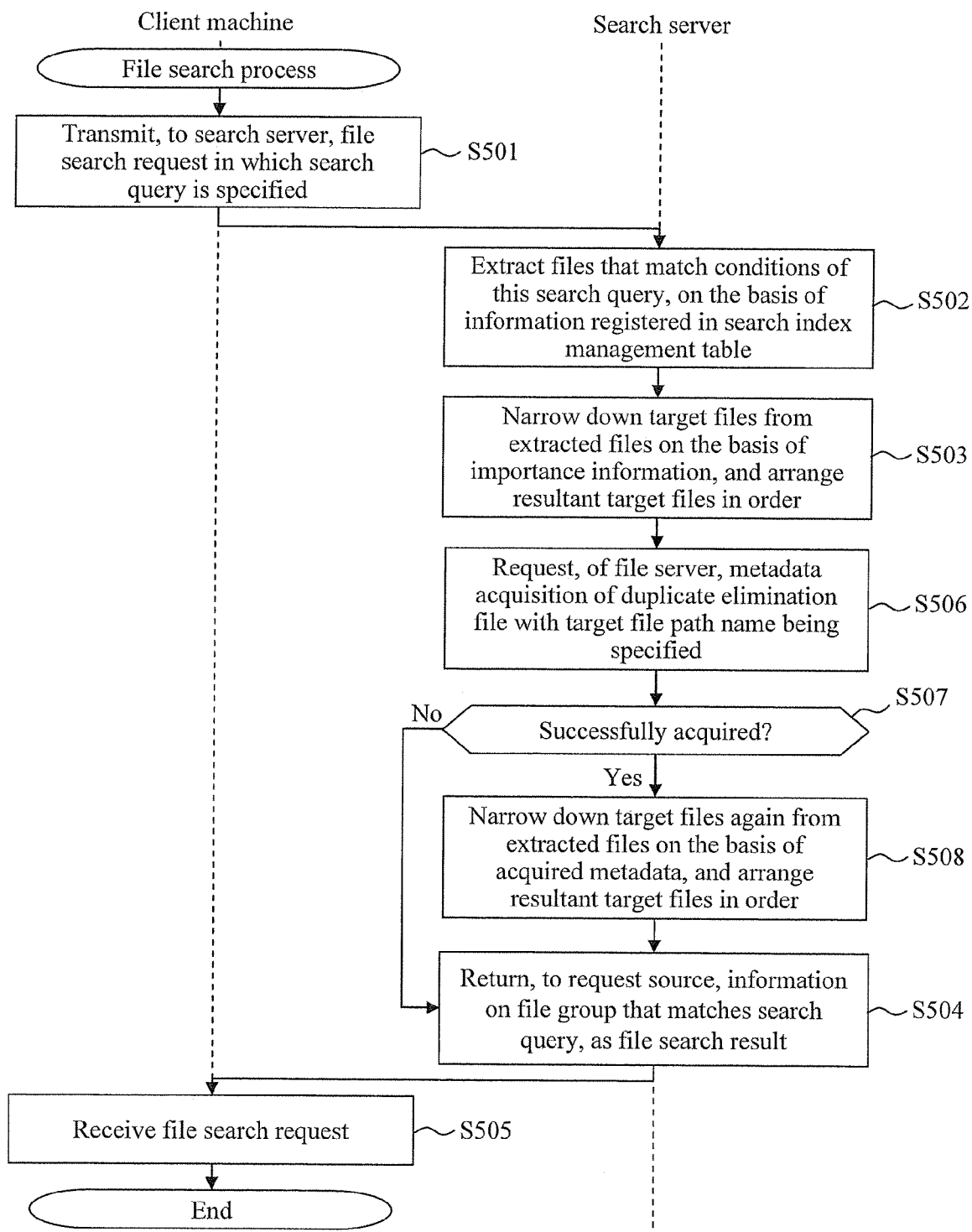
FIG. 27 is a flowchart for describing an exemplary file search process according to Embodiment 4.

In order to enable the search server 2100 to acquire the metadata of the registered file associated to each virtual file, it is necessary to achieve the acquisition process for the metadata. With reference to FIG. 25, processing contents of this process are described as the metadata acquisition process for the duplicate elimination file. In addition, the use of the metadata acquisition process enables the search server 2100 to narrow down the files to be included in the search result on the basis of the access right information set for the search target file. The factor for starting this narrowing-down process is the search index creation and the file search request from the client machine 3100. Then, in order to start the narrowing-down process at the time of the search index creation, it is necessary to change part of the contents of the crawling and indexing process described above in FIG. 14. With reference to FIG. 26, the changed contents thereof are described. In addition, in order to start the narrowing-down process at the time of the file search request, it is necessary to change part of the contents of the file search process described above in FIG. 15. With reference to FIG. 27, the changed contents thereof are described.

With reference to FIG. 25, description is given of a series of processing flow in the metadata acquisition process for the duplicate elimination file. First of all, the file server 1100 receives a metadata acquisition request transmitted from a device other than the file server 1100 (Step 1301). The metadata acquisition request may be transmitted in this step using the same method, command, or API as those for the metadata acquisition request of a file in a conventional file system. For example, it is assumed that a conventional metadata acquisition command is "get-metadata". If this command of "get-metadata" is executed on a file in the conventional file system, metadata of the target file can be acquired. Meanwhile, if this command is executed on a virtual file in the virtual file system according to the present invention, metadata of a registered file associated to the target virtual file can also be acquired in addition to metadata of the target virtual file itself. If a plurality of registered files are associated to the target virtual file, metadata information on all the corresponding registered files may be acquired, or metadata information on any one of the registered files may be acquired. In addition, the acquisition of only the metadata of the virtual file itself, the acquisition of only the metadata of any registered file associated to the virtual file, and the acquisition of the metadata set of all the registered files associated to the virtual file may be achieved by optionally specifying the metadata acquisition command.

After the reception of the metadata acquisition request, the file server 1100 examines whether or not the acquisition target file is specified by the virtual file path name in the received metadata acquisition request (Step S1302). If No in Processing Step S1302, the file server 1100 determines that the metadata acquisition process request is made to the file irrelevant to the virtual file system, returns an acquisition process failure to the request source (Step S1309), and ends the process. Note that, in the case where a registered file system existing in the registered file system is specified as the metadata acquisition target, the file server 1100 may provide metadata of this registered file in Processing Step S1309.

On the other hand, if Yes in Processing Step S1302, the file server 1100 examines whether or not the specified virtual file path name is registered in the virtual file system management table 4300 (Step S1303). If No in Processing Step S1303, the file server 1100 determines that the metadata acquisition process request is made to the virtual file not existing in the virtual file system, and goes to Processing Step S1309. On the other hand, if YES in Processing Step S1303, the file server 1100 acquires the stored file ID corresponding to the specified virtual file path name from the virtual file system management table 4300 (Step S1304). After that, the file server 1100 acquires the registered file ID corresponding to the acquired stored file ID from the stored file management table 4200 (Step S1305). After that, the file server 1100 acquires the metadata information corresponding to the registered file from the registered file management table 4100 (Step S1306). After that, the file server 1100 examines whether or not any registered file corresponding to the acquired stored file ID exists, other than the registered file the metadata of which is acquired in Processing Step S1306 (Step S1307). If Yes in Processing Step S1307, the file server 1100 goes to Processing Step S1305, and continuously acquires the information on the corresponding registered file. Note that, in the case where only the metadata of any one registered file needs to be acquired, the file server 1100 may skip this step to go to Processing Step S1308 described below. On the other hand, if No in Processing Step S1307, the file server 1100 returns the acquired registered file ID and the metadata set to the request source (Step S1308).

Through the above-mentioned process, the file server 1100 can provide the metadata information on the registered file associated to the virtual file in the virtual file system.

With reference to FIG. 26, the changed contents of the crawling and indexing process are described. Compared with the crawling and indexing process described in FIG. 14, in this processing flow, the metadata acquisition function for the duplicate elimination file described above in FIG. 25 is used for a crawling target virtual file, whereby the metadata information on a registered file associated to the target virtual file can also be acquired. Specific description thereof is given below.

First of all, after performing the processing steps from the beginning to S405 of the crawling and indexing process in FIG. 14, the search server 2100 requests, of the file server, the metadata acquisition of the duplicate elimination file with the target file path name being specified (Step S412). Because the virtual file in the virtual file system of the file server 1100 is crawled from the search server 2100, the virtual path name in the virtual file system is specified in this step as the target file path name. Because the metadata acquisition request is made using the virtual file path name, the file server 1100 performs the metadata acquisition process for the duplicate elimination file described above in FIG. 25. After the reception of a response to the request, the search server 2100 examines whether or not the metadata has been successfully acquired (Step S413). If No in Processing Step S413, the search server 2100 determines that the metadata has not been successfully acquired, and goes to Processing Step S407 to perform the same process as that in FIG. 14 hereafter. On the other hand, if Yes in Processing Step S413, the search server 2100 determines that the metadata has been successfully acquired, and registers the acquired metadata into the crawled file management table 4400 (Step S414). Specifically, the search server 2100 searches the crawled file management table 4400 for an entry in which the target file path name matches, and registers the metadata set acquired this time into the section of the metadata 4440 of this entry. After the registration of the acquired metadata, the search server 2100 goes to Processing Step S407 to perform the same process as that in FIG. 14 hereafter.

With reference to FIG. 27, the changed contents of the file search process are described. Compared with the file search process described in FIG. 15, in this processing flow, the metadata acquisition function for the duplicate elimination file described above in FIG. 25 is used for a file group that matches conditions of a search query, whereby the metadata information on registered files associated to the file group can also be acquired. This can exclude a file without the access right from the search result. Specific description thereof is given below.

First of all, after performing the processing steps from the beginning to S503 of the file search process in FIG. 15, the search server 2100 requests, of the file server, the metadata acquisition of the duplicate elimination file with the target file path name being specified (Step S506). Because the virtual file in the virtual file system of the file server 1100 is crawled from the search server 2100, the virtual path name in the virtual file system is specified in this step as the target file path name. Because the metadata acquisition request is made using the virtual file path name, the file server 1100 performs the metadata acquisition process for the duplicate elimination file described above in FIG. 25. After the reception of a response to the request, the search server 2100 examines whether or not the metadata has been successfully acquired (Step S507). If No in Processing Step S507, the search server 2100 determines that the metadata has not been successfully acquired, and goes to Processing Step S504 to perform the same process as that in FIG. 15 hereafter. On the other hand, if Yes in Processing Step S507, the search server 2100 determines that the metadata has been successfully acquired, narrows down target files again from the extracted files that match the conditions of the search query, on the basis of the acquired metadata, and arranges the resultant target files in order (Step S508). For example, it is even possible to cause the search result to include only files that the user who has sent the search query can access, on the basis of the access right information contained in the acquired metadata. After Processing Step S508, the search server 2100 goes to Processing Step S407 to perform the same process as that in FIG. 15 hereafter.

Embodiment 5

In Embodiment 1 described above, the search server 2100 crawls the virtual file system 1172 in the file server 1100 to thereby create the search index 2101. Not limited thereto, an embodiment in which the stored file system 1171 in the file server 1100 is provided instead of the virtual file system 1172 can also be conceived. According to the present embodiment, the file server 1100 can provide a group of stored files without duplication to the search server 2100. In the embodiment in which the virtual file system 1172 is provided, the file system image can be provided so as to focus on the crawling process by the search server 2100. In contrast, in the embodiment in which the stored file system 1171 is provided, the special virtual file system 1172 does not need to be created, and hence the file system image can be provided at low overhead. In view of the above, description is given below, as Embodiment 5, of a control method concerning the embodiment in which the stored file system 1171 in the file server 1100 is provided for the search server 2100.

Figure 28:
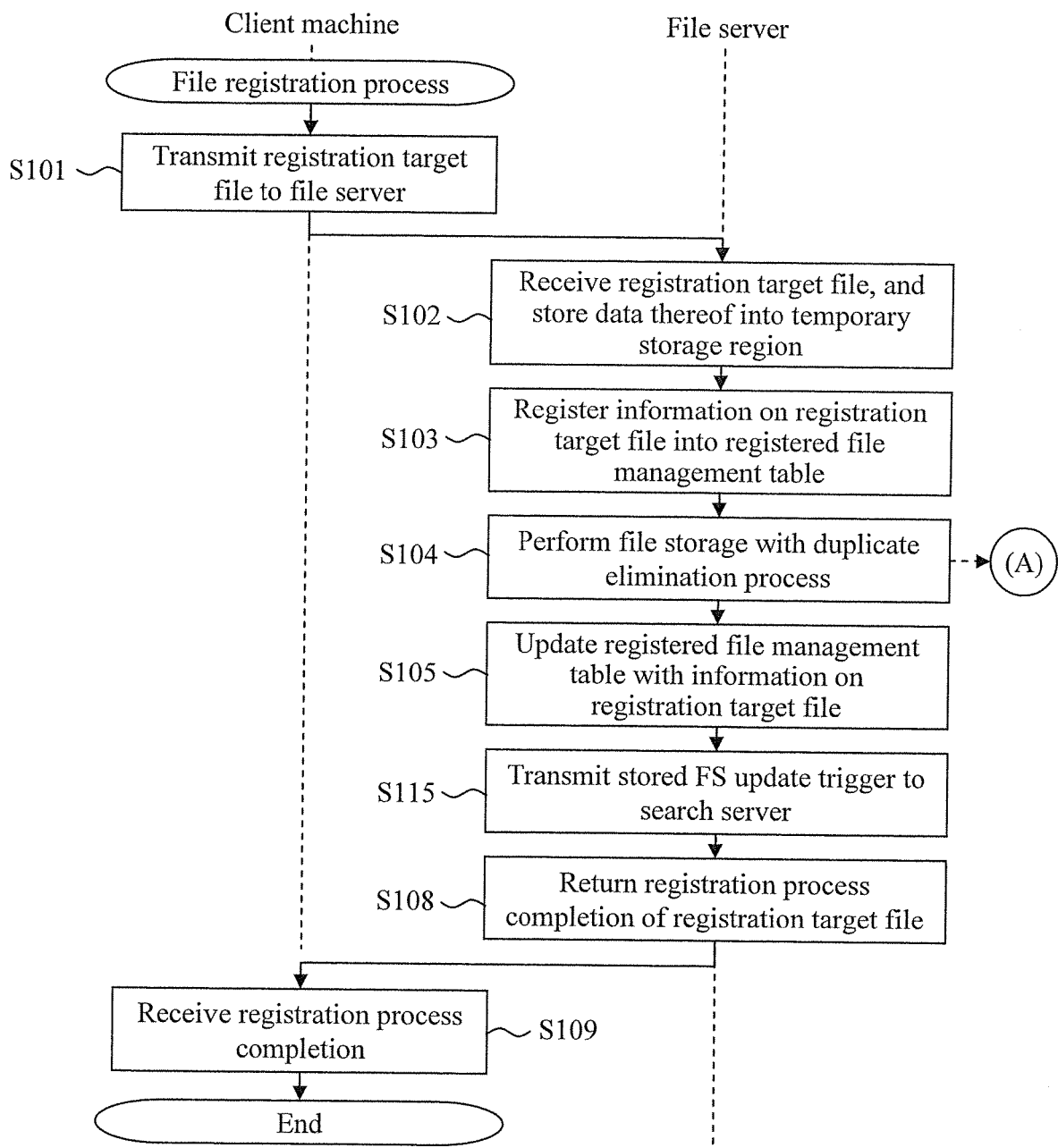
FIG. 28 is a flowchart for describing an exemplary file registration process according to Embodiment 5.

In order to provide the stored file system 1171 as described above instead of providing the virtual file system 1172, it is necessary to change part of the contents of processes related to the file access from the client machine 3100 and the search server 2100. Specifically, such file access related processes correspond to the file registration process, the file update process, the file deletion process, the file acquisition process, and the metadata acquisition process for the duplicate elimination file. With reference to FIG. 28, the changed contents of the file registration process are described here. Note that the changed contents of the file update process and the file deletion process overlap with those of the file registration process, and hence description thereof is omitted here. In addition, with reference to FIG. 29, the changed contents of the file acquisition process are described. In addition, with reference to FIG. 30, the changed contents of the metadata acquisition process for the duplicate elimination file are described.

With reference to FIG. 28, the changed contents of the file registration process are described. Compared with the file registration process described in FIG. 11, in this processing flow, the stored file system 1171 that holds files after duplicate elimination is provided for the search server 2100, without creating the virtual file system. Specific description thereof is given below.

First of all, after performing the processing steps from the beginning to S105 of the file registration process in FIG. 11, the file server 1100 transmits a stored file system update trigger to the search server 2100 (Step S115). Specifically, after making such settings that the stored file system 1171 in the file server 1100 can be accessed from a device other than the file server 1100, the file server 1100 transmits, to the search server 2100, a trigger that serves as a factor for starting the crawling process on the stored file system 1171. After the reception of this trigger, the search server 2100 starts the crawling process. After Processing Step S115, the file server 1100 goes to Processing Step S108 to perform the same process as that in FIG. 11 hereafter.

Figure 29:
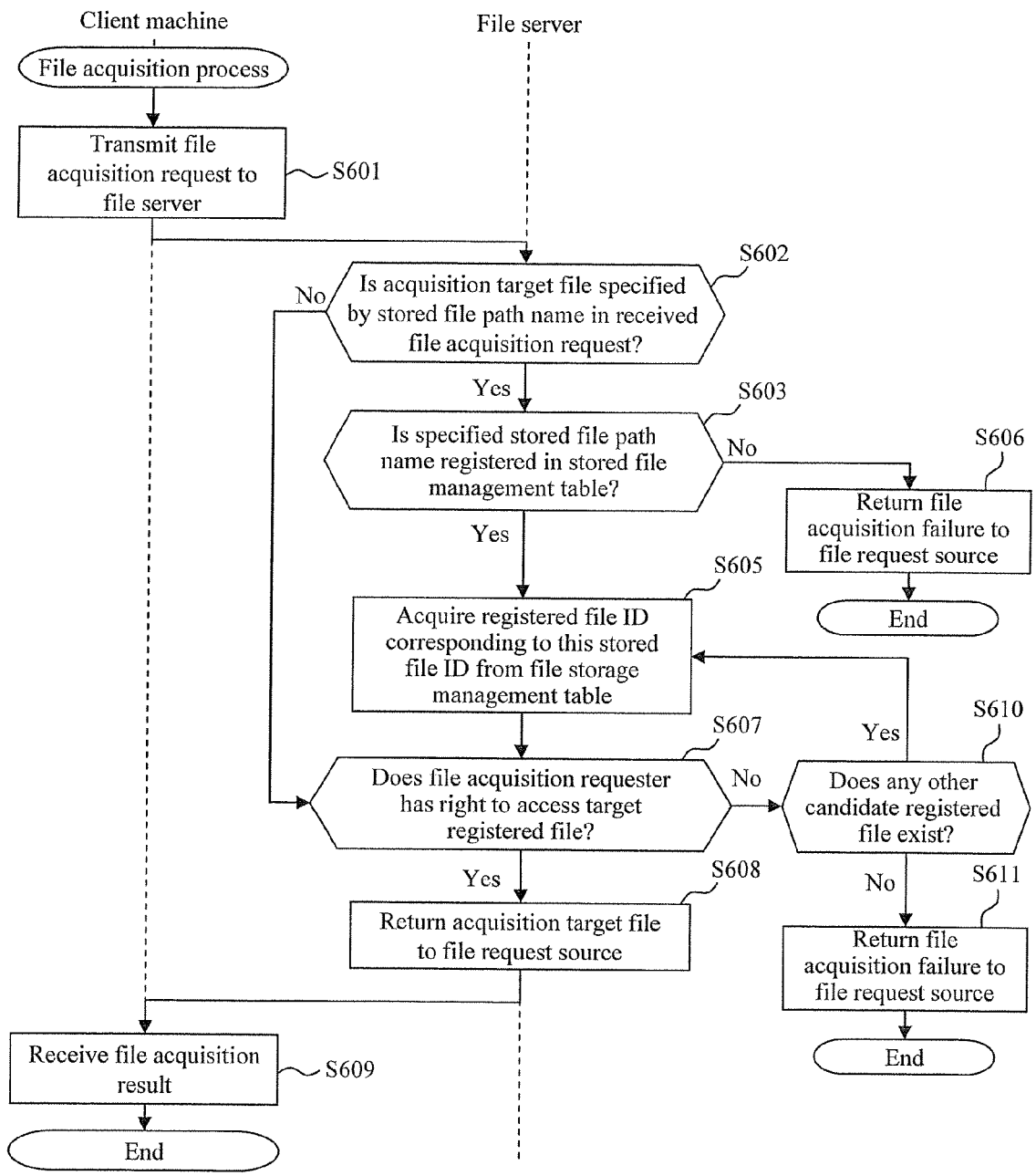
FIG. 29 is a flowchart for describing an exemplary file acquisition process according to Embodiment 5.

With reference to FIG. 29, the changed contents of the file acquisition process are described. Compared with the file registration process described in FIG. 16, in this processing flow, the need to perform the step of acquiring the stored file ID corresponding to the specified virtual file path name is eliminated. Specific description thereof is given below.

First of all, after performing the processing steps from the beginning to S603 of the file acquisition process in FIG. 16, if Yes in Processing Step S603, the file server 1100 goes to Processing Step S605 without performing Processing Step S604. The file server 1100 performs the same process as that in FIG. 15 hereafter. This is because, when the file server 1100 receives the file acquisition request from the client machine 3100, the stored file path name is specified as the file path name specified by the client machine 3100 in the present embodiment.

Figure 30:
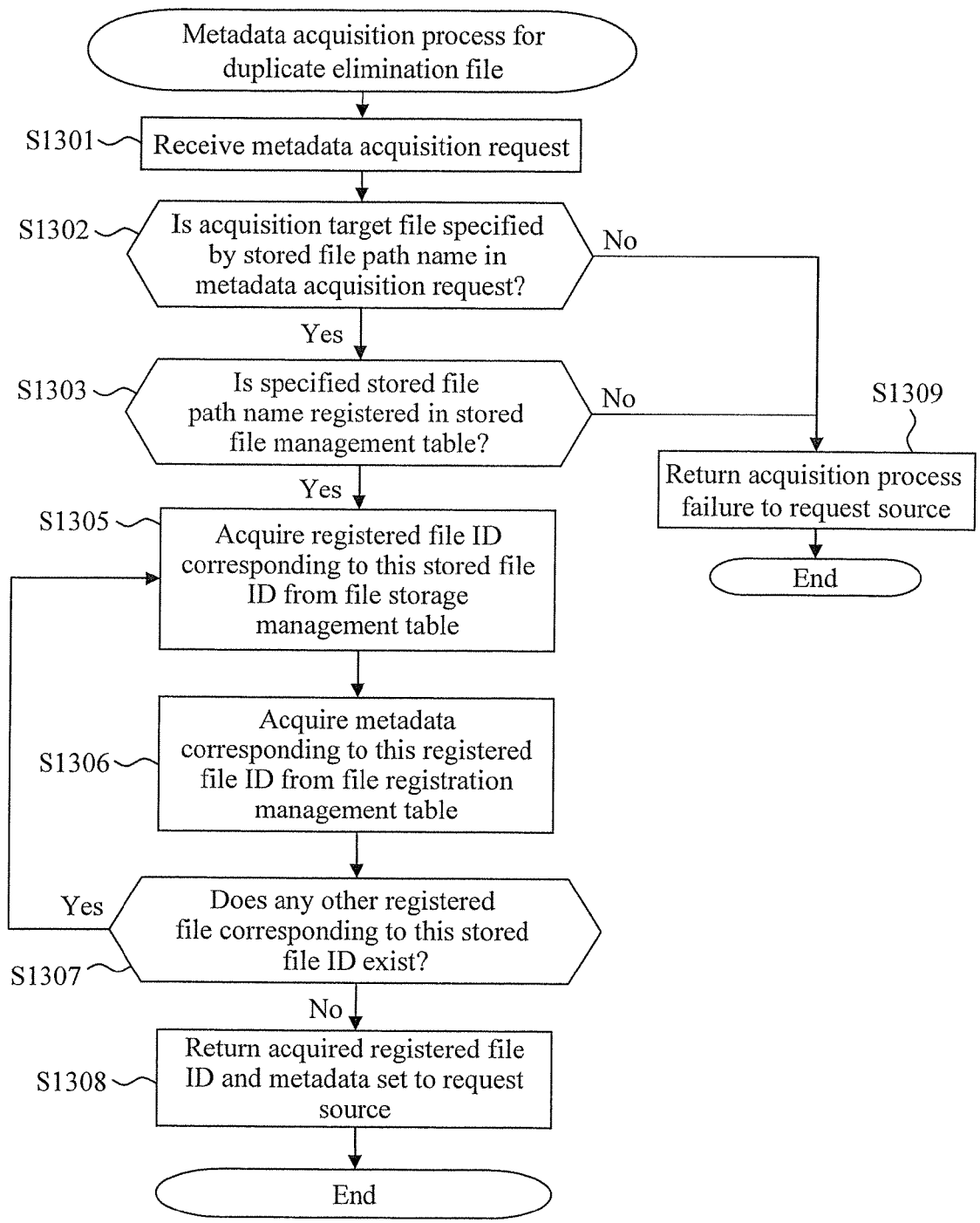
FIG. 30 is a flowchart for describing an exemplary metadata acquisition process for a duplicate elimination file according to Embodiment 5.

With reference to FIG. 30, the changed contents of the metadata acquisition process for the duplicate elimination file are described. Compared with the metadata acquisition process for the duplicate elimination file described in FIG. 25, in this processing flow, the need to perform the step of acquiring the stored file ID corresponding to the specified virtual file path name is eliminated. Specific description thereof is given below.

First of all, after performing the processing steps from the beginning to S1303 of the file acquisition process in FIG. 25, if Yes in Processing Step S1303, the file server 1100 goes to Processing Step S1305 without performing Processing Step S1304. The file server 1100 performs the same process as that in FIG. 25 hereafter. This is because, when the file server 1100 receives the metadata acquisition request of the duplicate elimination file from the search server 2100, the stored file path name is specified as the file path name specified by the search server 2100 in the present embodiment.

Embodiment 6

In Embodiment 1 described above, the file server 1100 notifies the search server 2100 of a trigger in the file registration process, the file update process, and the file deletion process. Not limited thereto, an embodiment in which this trigger is not transmitted to the search server 2100 can also be conceived. According to the present embodiment, the search server 2100 can crawl a target virtual file system on the basis of a free starting factor, instead of receiving the trigger notification from the file server 1100. In the embodiment in which the search server 2100 is notified of the trigger, the search server 2100 can perform crawling with the virtual file system update in the file server 1100 being completed, and hence the consistency between the file server 1100 and the search server 2100 can be easily obtained. In contrast, in the embodiment in which the search server 2100 is not notified of the trigger, the search server 2100 cannot always perform crawling with the virtual file system update in the file server 1100 being completed, and hence the consistency therebetween is difficult to obtain. Instead, the overhead of trigger transmission can be reduced. In view of the above, description is given below, as Embodiment 6, of a control method concerning the embodiment in which the file server 1100 does not notify the search server 2100 of the trigger in the file registration process, the file update process, and the file deletion process.

In order to achieve the embodiment in which the search server 2100 is not notified of the trigger as described above, it is necessary to change part of the contents of the file access related processes by the file server 1100 and the crawling and indexing process by the search server 2100. Specifically, such processes to be changed correspond to the file registration process, the file update process, the file deletion process, and the crawling and indexing process.

The changed contents of the file registration process are as follows. Processing Step S107 in FIG. 11, FIG. 23, and in FIG. 24 is omitted. In addition, Processing Step S115 in FIG. 28 is omitted. As a result of these omissions, the trigger is not transmitted in the file registration process.

Next, the changed contents of the file update process are as follows. Processing Step S707 in FIG. 17 is omitted. As a result of this omission, the trigger is not transmitted in the file update process.

Next, the changed contents of the file deletion process are as follows. Processing Step S1005 in FIG. 20 is omitted. As a result of this omission, the trigger is not transmitted in the file deletion process.

Lastly, the changed contents of the crawling and indexing process are as follows. Processing Step S401 in FIG. 14 and FIG. 26 is omitted. As a result of these omissions, the trigger is not received in the crawling and indexing process. Note that the search server 2100 may execute the processes illustrated in FIG. 14 and FIG. 26 on the basis of a starting factor of its own determination.

Embodiment 7

In Embodiment 1 described above, the factor for starting the virtual file system update in the file server 1100 is the file registration process, the file update process, and the file deletion process. In such an embodiment, the virtual file system update is performed without considering conditions of the search index creation process in the search server 2100. Unfortunately, even if the file server 1100 notifies the search server 2100 of the trigger after the virtual file system update, it may not be possible for the search server 2100 to start the search index creation process upon the reception of this trigger notification, depending on processing load conditions of the search server. Accordingly, in order to efficiently execute a process necessary for the file server 1100 at necessary timing, it is necessary to provide an embodiment in which the virtual file system update in the file server 1100 can be performed in consideration of the processing conditions of the search server 2100. In view of the above, description is given below, as Embodiment 7, of a control method concerning the embodiment that provides a mechanism in which the search server 2100 notifies the file server 1100 of a search index creation completion to the effect that the search index creation process in the search server 2100 has been completed, to thereby enable the search server 2100 to notify the file server 1100 of the start of the virtual file system update.

In order to achieve the embodiment in which the search server 2100 notifies the file server 1100 of the search index creation completion as described above, the following steps need to be added to the processes performed by the trigger communication control sub-program 1127 in the file server 1100 and the trigger communication control sub-program 2125 in the search server 2100.

The contents of the steps to be added are the following two. Firstly, in the processing flow of the crawling and indexing process in FIG. 14 and FIG. 26, a step in which the search server 2100 notifies the file server 1100 of the search index creation completion with the use of the trigger communication control sub-program 2125 is added as the last step of this processing flow. Secondly, in the processing flow of the asynchronous execution process for virtual file system update in FIG. 24, the reception of the search index creation completion notification by the trigger notification control sub-program 1127 of the file server 1100 is added as a factor for starting this processing flow. Upon the reception of this notification, the file server 1100 starts the asynchronous execution process for virtual file system update illustrated in FIG. 24. With the steps added as described above, the file server 1100 can perform the virtual file system update after the search index creation completion by the search server 2100, that is, after the next search index creation becomes possible. As a result, the virtual file system update process in the file server 1100 does not need to be executed more than necessary, leading to a reduction in load at the peak time of the file server 1100.

Note that the search server 2100 may notify the file server 1100 of the search index creation completion not after actual completion of the search index creation process but slightly before the process completion (for example, one minute before the process completion). As a result, the virtual file system update process in the file server 1100 can more effectively cooperate with the search index creation process in the search server 2100.

Industrial Applicability

According to the present invention, in a system including a file server that holds digital data and a search server that provides a search service of the data, the time required for a search index creation process in the search server can be reduced by using a duplicate elimination function of the file server. In addition, the search server creates a search index for data from which duplicated data is eliminated by the file server, and hence the data volume required for the search index in the search server can also be reduced. Accordingly, a reduction in costs of data processing and data storage concerning the search index in the search server can be expected.

Reference Signs List
10 . . . Network
1100, 1200, 1300 . . . File Server
1101, 1102, 1201, 1202, 1301, 1302 . . . File
2100, 2200 . . . Search Server
2101, 2201 . . . Search Index
3100, 3200, 3300 . . . Client Machine
1110, 2110, 3110 . . . Processor
1120, 2120, 3120 . . . Memory
1121, 2121, 3121 . . . External Memory Device I/F Control Program
1122, 2122, 3122 . . . Network I/F Control Program
    1123 . . . File Service Control Program
    1124 . . . File Management Control Program
    1125 . . . Duplicate Elimination Control Sub-program
    1126 . . . Virtual File System Management Control Sub-program
    1127 . . . Trigger Communication Control Sub-program
    1128 . . . Virtual Path Name Conversion Control Sub-program
    1129 . . . Duplicate File Metadata Control Sub-program
    1170 . . . Registered File System
    1171 . . . Stored File System
    1172 . . . Virtual File System
    2123 . . . Data Management Control Program
    2124 . . . Search Service Control Program
    2125 . . . Trigger Communication Control Sub-program
    2126 . . . Crawling Control Sub-program
    2127 . . . Indexing Control Sub-program
    2128 . . . Search Query Reception Control Sub-program
    2129 . . . Search Control Sub-program
    3123 . . . File Management Control Program
    3124 . . . File Server Access Client Control Program
    3125 . . . Search Server Access Client Control Program
1130, 2130, 3130 . . . External Memory Device I/F
1140, 2140, 3140 . . . Network I/F
1150, 2150, 3150 . . . Bus
1160, 2160, 3160 . . . External Memory Device
4100 . . . Registered File Management Table
4110 . . . Registered File ID
4120 . . . Registered File Path Name
4130 . . . Metadata of Registered File
4140 . . . Corresponding Stored File ID
4200 . . . Stored File Management Table
4210 . . . Stored File ID
4220 . . . Stored File Path Name
4230 . . . Metadata of Stored File
4240 . . . Duplicate Reference File Count
4250 . . . Checking Information
4260 . . . Corresponding Registered File ID
4300 . . . Virtual File System Management Table
4310 . . . Virtual File ID
4320 . . . Virtual File Path Name
4330 . . . Metadata of Virtual File
4340 . . . Checking Information
4350 . . . Corresponding Stored File ID
4400 . . . Crawled File Management Table
4410 . . . File Path Name
4420 . . . Creation Date and Time
4430 . . . Last Update Date and Time
4440 . . . Metadata
4500 . . . Search Index Management Table
4510 . . . Keyword
4520 . . . Corresponding Position Information
4521 . . . Corresponding File Path Name
4522 . . . Corresponding Position Offset
4523 . . . Importance Information

The invention claimed is:

1. A computer system, comprising:
a plurality of file servers; and
a search server connected to the file servers over a network, wherein each of the file servers includes:
  a processor; and
  a computer-readable storage media encoded with instructions that cause the processor to execute:
  a duplicate elimination control unit that detects duplication of stored data of the respective file server and deletes the stored data whose duplication is detected by executing a duplicate elimination process; and
  a file management control unit that creates a file system of the stored data of the respective file server after the execution of the duplicate elimination process which deletes the stored data whose duplication is detected by the duplicate elimination control unit and before file acquisition for search index creation by the search server, and wherein the search server includes:
  a processor; and
  a computer-readable storage media encoded with instructions that cause the processor to execute:
  acquisition of the respective file systems of the file servers for search index creation in the search server after the execution of the duplicate elimination process.

2. The computer system according to claim 1, wherein the file system is stored in the computer-readable storage media after the execution of the duplicate elimination process.

3. The computer system according to claim 1, wherein the file system is a virtual file system that is created on a basis of an actual stored file system at a given time point after the execution of the duplicate elimination process.

4. The computer system according to claim 3, wherein:
the duplicate elimination control unit executes the duplicate elimination process synchronously with a registration process of the stored data; and
the file management control unit updates the virtual file system synchronously with the registration process of the stored data.

5. The computer system according to claim 3, wherein:
the duplicate elimination control unit executes the duplicate elimination process synchronously with a registration process of the stored data; and
the file management control unit updates the virtual file system asynchronously to the registration process of the stored data.

6. The computer system according to claim 3, wherein:
the duplicate elimination control unit executes the duplicate elimination process asynchronously to a registration process of the stored data; and
the file management control unit updates the virtual file system asynchronously to the registration process of the stored data.

7. The computer system according to claim 3, wherein each of the file servers includes further includes:
a functional unit provided in the file management system, the functional unit acquiring and/or updating metadata on the actual stored file system after the execution of the duplicate elimination process, the actual stored file system being associated to the virtual file system.

8. The computer system according to claim 7, wherein
the functional unit provides an interface for acquiring or updating the metadata.

9. The computer system according to claim 3, wherein
the functional unit further has a trigger notification function of notifying a control device of update completion of the virtual file system.

10. The computer system according to claim 3, wherein
the file management system starts to update the virtual file system upon reception of an update request notification of the virtual file system from a control device.

11. The computer system according to any one of claims 1 to 3, wherein
the duplicate elimination control unit detects the duplication of the stored data by checking on a file level.

12. The computer system according to any one of claims 1 to 3, wherein
the duplicate elimination control unit detects the duplication of the stored data by checking on a fixed block level, the fixed block constituting a file.

13. A computer system comprising:
a control device that is connected via a network to a plurality of data storage devices that respectively store data, each of the data storage devices including:
a processor; and
a computer-readable storage media encoded with instructions that cause the processor to execute:
a duplicate elimination control unit that deletes duplicate stored data of the data storage device; and
a file management control unit that creates a file system after execution of a duplicate elimination process which deletes the stored data of the data storage device whose duplication is detected by the duplicate elimination control unit and before file acquisition for search index creation by the control device connected via the network to the data storage device,
the control device including:
a processor; and
a computer-readable storage media encoded with instructions that cause the processor to execute:
a crawling control unit that acquires the respective file systems from the data storage devices and stores the acquired file systems into the computer-readable storage media; and
an indexing control unit that creates respective search indexes for the stored data stored in the data storage devices on a basis of the acquired file systems.

14. The computer system according to claim 13, wherein
the crawling control unit starts to acquire the respective file systems upon reception of trigger notifications individually from the data storage devices, the trigger notifications indicating completion of an update process of the file systems.

15. The computer system according to claim 1, wherein
the stored data is a plurality of search indexes.

16. The computer system according to claim 13, wherein
the stored data is a plurality of search indexes.

* * * * *